US012068997B2

(12) United States Patent
Ma et al.

(10) Patent No.: US 12,068,997 B2
(45) Date of Patent: Aug. 20, 2024

(54) FREQUENCY CONFIGURATION FOR CONTROL RESOURCE SET IN NON-TERRESTRIAL NETWORKS

(71) Applicant: QUALCOMM Incorporated, San Diego, CA (US)

(72) Inventors: Liangping Ma, San Diego, CA (US); Xiao Feng Wang, San Diego, CA (US); Hung Dinh Ly, San Diego, CA (US); Alberto Rico Alvarino, San Diego, CA (US); Peter Gaal, San Diego, CA (US); Ayan Sengupta, San Diego, CA (US); Bharat Shrestha, San Diego, CA (US); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/383,741

(22) Filed: Jul. 23, 2021

(65) Prior Publication Data
US 2022/0038240 A1 Feb. 3, 2022

Related U.S. Application Data

(60) Provisional application No. 63/058,956, filed on Jul. 30, 2020.

(51) Int. Cl.
*H04L 5/00* (2006.01)
*H04W 4/02* (2018.01)
*H04W 56/00* (2009.01)

(52) U.S. Cl.
CPC ......... *H04L 5/0053* (2013.01); *H04W 56/001* (2013.01)

(58) Field of Classification Search
CPC ... H04L 5/0053; H04L 5/0094; H04L 5/0048; H04L 5/0078; H04W 56/001
See application file for complete search history.

(56) References Cited

U.S. PATENT DOCUMENTS

2018/0192383 A1  7/2018  Nam et al.
2019/0132170 A1  5/2019  Si et al.
(Continued)

FOREIGN PATENT DOCUMENTS

EP         3515123 A1      7/2019
WO    WO-2012128679 A1    9/2012
(Continued)

OTHER PUBLICATIONS

3GPP TSG RAN WG1 Meeting#92bis, R1-1804590 Title: Remaining details on RACH timing for NR (Year: 2018).*
(Continued)

*Primary Examiner* — Faruk Hamza
*Assistant Examiner* — Abusayeed M Haque
(74) *Attorney, Agent, or Firm* — Holland & Hart LLP

(57) ABSTRACT

Methods, systems, and devices for wireless communications are described. A non-terrestrial network (NTN) device (e.g., a satellite, base station) may transmit, to a user equipment (UE), at a first frequency a synchronization signal block (SSB) that indicates a second frequency of a control resource set (CORESET) relative to the SSB, where the second frequency is based on one or more of: a CORESET bandwidth, a combination of a first parameter associated with a first portion of the SSB and a second parameter associated with a second portion of the SSB, or both. The UE may monitor the CORESET at the indicated second frequency for a downlink control channel transmission. The NTN device may transmit, to the UE, a downlink control channel transmission over the CORESET. The NTN device may transmit, to the UE, system information based on the downlink control channel transmission.

26 Claims, 17 Drawing Sheets

(56) References Cited

U.S. PATENT DOCUMENTS

| | | | |
|---|---|---|---|
| 2019/0159226 A1 | 5/2019 | Ly et al. | |
| 2019/0254110 A1* | 8/2019 | He | H04L 5/0048 |
| 2019/0306847 A1* | 10/2019 | Seo | H04W 72/046 |
| 2020/0107344 A1* | 4/2020 | Xu | H04W 68/005 |
| 2020/0162222 A1* | 5/2020 | Liu | H04L 5/0053 |
| 2020/0209927 A1* | 7/2020 | Ko | G06F 3/0446 |
| 2020/0351136 A1* | 11/2020 | Hwang | H04L 27/26025 |
| 2022/0078718 A1 | 3/2022 | Hoshino et al. | |
| 2022/0209927 A1 | 6/2022 | Shreevastav et al. | |
| 2022/0312481 A1* | 9/2022 | Talarico | H04W 74/0866 |
| 2022/0361209 A1* | 11/2022 | Zhu | H04W 72/1273 |
| 2023/0179343 A1* | 6/2023 | Navrátil | H04L 1/1896 |
| | | | 370/328 |

FOREIGN PATENT DOCUMENTS

| | | | | |
|---|---|---|---|---|
| WO | WO-2020146377 A1 * | 7/2020 | | H04L 5/0014 |
| WO | WO-2020263053 A1 * | 12/2020 | | H04B 17/318 |
| WO | WO-2021010786 A1 * | 1/2021 | | H04L 5/0053 |

OTHER PUBLICATIONS

3GPP TSG RAN WG1 Meeting#96bis, R1-1905403 Title:Synchronized Signals Evaluations and procedures for NR V2X sidelink (Year: 2019).*

International Search Report and Written Opinion—PCT/US2021/043141—ISA/EPO—Nov. 19, 2021 (206458WO).

* cited by examiner

FREQUENCY CONFIGURATION FOR CONTROL RESOURCE SET IN NON-TERRESTRIAL NETWORKS

CROSS REFERENCE

The present application for patent claims the benefit of U.S. Provisional Patent Application No. 63/058,956 by Ma et al., entitled "FREQUENCY CONFIGURATION FOR CONTROL RESOURCE SET IN NON-TERRESTRIAL NETWORKS," filed Jul. 30, 2020, assigned to the assignee hereof, and expressly incorporated by reference herein.

FIELD OF TECHNOLOGY

The following relates to wireless communications, including frequency configuration for control resource set (CORESET) in non-terrestrial networks (NTNs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may perform a random access procedure to gain access to a network. If multiple UEs attempt to perform the random access procedure at a same time using overlapping frequencies, contention may occur.

SUMMARY

The described techniques relate to improved methods, systems, devices, and apparatuses that support frequency configuration for control resource set (CORESET) in non-terrestrial networks (NTNs). Generally, the described techniques provide for a user equipment (UE) to be configured with an offset for a CORESET relative to a synchronization signal block (SSB) based on a CORESET bandwidth, a combination of a first and second parameter associated with the SSB, or both. For example, an NTN device (e.g., a satellite) may transmit, to a UE, at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both. The UE may monitor the CORESET at the indicated second frequency for a downlink control channel transmission. The NTN device may transmit, to the UE, a downlink control channel transmission over the CORESET. The NTN device may transmit, to the UE, system information (SI) based on the downlink control channel transmission.

A method for wireless communication is described. The method may include receiving at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both, monitoring the CORESET at the indicated second frequency for a downlink control channel transmission, and receiving SI based on the downlink control channel transmission.

An apparatus for wireless communication is described. The apparatus may include a processor, memory coupled with the processor, and instructions stored in the memory. The instructions may be executable by the processor to cause the apparatus to receive at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both, monitor the CORESET at the indicated second frequency for a downlink control channel transmission, and receive SI based on the downlink control channel transmission.

Another apparatus for wireless communication is described. The apparatus may include means for receiving at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both, means for monitoring the CORESET at the indicated second frequency for a downlink control channel transmission, and means for receiving SI based on the downlink control channel transmission.

A non-transitory computer-readable medium storing code for wireless communication is described. The code may include instructions executable by a processor to receive at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both, monitor the CORESET at the indicated second frequency for a downlink control channel transmission, and receive SI based on the downlink control channel transmission.

In some examples of the method, apparatuses, and non-transitory computer-readable medium described herein, receiving at the first frequency the SSB may include operations, features, means, or instructions for receiving an indication of a frequency offset, where the frequency offset may be based on the CORESET bandwidth and determining the second frequency based on the first frequency and the received frequency offset.

In some examples of the method, apparatuses, and non-transitory computer-readable medium described herein, the frequency offset may be further based on an SSB index.

In some examples of the method, apparatuses, and non-transitory computer-readable medium described herein, the frequency offset may be further based on a user density at or within a threshold distance of a geographic location of the UE.

In some examples of the method, apparatuses, and non-transitory computer-readable medium described herein, receiving the indication of the frequency offset may include operations, features, means, or instructions for receiving a master information block (MIB) of the SSB, where the MIB includes the indication of the frequency offset.

In some examples of the method, apparatuses, and non-transitory computer-readable medium described herein, the indication of the frequency offset includes an explicit indication of the frequency offset.

In some examples of the method, apparatuses, and non-transitory computer-readable medium described herein, the SSB may be associated with a demodulation reference signal (DMRS) sequence that maps to the second frequency.

In some examples of the method, apparatuses, and non-transitory computer-readable medium described herein, the CORESET bandwidth includes a bandwidth of the CORESET.

Some examples of the method, apparatuses, and non-transitory computer-readable medium described herein may further include operations, features, means, or instructions for receiving at the first frequency a second SSB prior to the SSB, where the second SSB indicates a third frequency of a second CORESET relative to the second SSB, where the CORESET bandwidth includes a bandwidth of the second CORESET.

Some examples of the method, apparatuses, and non-transitory computer-readable medium described herein may further include operations, features, means, or instructions for determining a frequency offset based on the combination of the first parameter associated with the first portion of the SSB and the second parameter associated with the second portion of the SSB and determining the second frequency based on the first frequency and the frequency offset.

In some examples of the method, apparatuses, and non-transitory computer-readable medium described herein, receiving at the first frequency the SSB may include operations, features, means, or instructions for receiving a MIB, where the first portion of the SSB includes a first field of the MIB, and where the second portion of the SSB includes one or more of: a spare bit of the MIB, a second field of the MIB, or a field of a physical broadcast channel (PBCH) transmission that may be outside of the MIB.

In some examples of the method, apparatuses, and non-transitory computer-readable medium described herein, the first field of the MIB may be associated with the CORESET.

In some examples of the method, apparatuses, and non-transitory computer-readable medium described herein, the SSB may be associated with a DMRS sequence that maps to the second parameter.

Some examples of the method, apparatuses, and non-transitory computer-readable medium described herein may further include operations, features, means, or instructions for determining that the second parameter may be absent from the SSB and determining the second parameter based on the CORESET bandwidth and the absence of the second parameter from the SSB.

In some examples of the method, apparatuses, and non-transitory computer-readable medium described herein, determining the frequency offset may include operations, features, means, or instructions for combining the first parameter and the second parameter.

Some examples of the method, apparatuses, and non-transitory computer-readable medium described herein may further include operations, features, means, or instructions for determining an initial downlink bandwidth part (BWP) that overlaps with the CORESET in frequency based on receiving the SI and performing a random access procedure over the initial downlink BWP.

A method for wireless communication is described. The method may include transmitting at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both, transmitting a downlink control channel transmission over the CORESET, and transmitting SI based on the downlink control channel transmission.

An apparatus for wireless communication is described. The apparatus may include a processor, memory coupled with the processor, and instructions stored in the memory. The instructions may be executable by the processor to cause the apparatus to transmit at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both, transmit a downlink control channel transmission over the CORESET, and transmit SI based on the downlink control channel transmission.

Another apparatus for wireless communication is described. The apparatus may include means for transmitting at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both, means for transmitting a downlink control channel transmission over the CORESET, and means for transmitting SI based on the downlink control channel transmission.

A non-transitory computer-readable medium storing code for wireless communication is described. The code may include instructions executable by a processor to transmit at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both, transmit a downlink control channel transmission over the CORESET, and transmit SI based on the downlink control channel transmission.

In some examples of the method, apparatuses, and non-transitory computer-readable medium described herein, transmitting at the first frequency the SSB may include operations, features, means, or instructions for determining the second frequency based on the first frequency and a frequency offset, where the frequency offset may be based on the CORESET bandwidth and transmitting an indication of the frequency offset.

Some examples of the method, apparatuses, and non-transitory computer-readable medium described herein may further include operations, features, means, or instructions for determining the frequency offset based on an SSB index.

Some examples of the method, apparatuses, and non-transitory computer-readable medium described herein may further include operations, features, means, or instructions for determining the frequency offset based on a user density at or within a threshold distance of a geographic location of a UE and transmitting, to the UE, the SSB.

In some examples of the method, apparatuses, and non-transitory computer-readable medium described herein, transmitting the indication of the frequency offset may include operations, features, means, or instructions for transmitting a MIB of the SSB, where the MIB includes the indication of the frequency offset.

In some examples of the method, apparatuses, and non-transitory computer-readable medium described herein, the indication of the frequency offset includes an explicit indication of the frequency offset.

In some examples of the method, apparatuses, and non-transitory computer-readable medium described herein, the SSB may be associated with a DMRS sequence that maps to the second frequency.

In some examples of the method, apparatuses, and non-transitory computer-readable medium described herein, the CORESET bandwidth includes a bandwidth of the CORESET.

Some examples of the method, apparatuses, and non-transitory computer-readable medium described herein may further include operations, features, means, or instructions for transmitting at the first frequency a second SSB prior to the SSB, where the second SSB indicates a third frequency of a second CORESET relative to the second SSB, where the CORESET bandwidth includes a bandwidth of the second CORESET.

Some examples of the method, apparatuses, and non-transitory computer-readable medium described herein may further include operations, features, means, or instructions for determining a frequency offset based on the combination of the first parameter associated with the first portion of the SSB and the second parameter associated with the second portion of the SSB and determining the second frequency based on the first frequency and the frequency offset.

In some examples of the method, apparatuses, and non-transitory computer-readable medium described herein, transmitting at the first frequency the SSB may include operations, features, means, or instructions for transmitting a MIB, where the first portion of the SSB includes a first field of the MIB, and where the second portion of the SSB includes one or more of: a spare bit of the MIB, a second field of the MIB, or a field of a PBCH transmission that may be outside of the MIB.

In some examples of the method, apparatuses, and non-transitory computer-readable medium described herein, the first field of the MIB may be associated with the CORESET.

In some examples of the method, apparatuses, and non-transitory computer-readable medium described herein, the SSB may be associated with a DMRS sequence that maps to a value of the second parameter.

Some examples of the method, apparatuses, and non-transitory computer-readable medium described herein may further include operations, features, means, or instructions for determining a value of the second parameter based on the CORESET bandwidth.

Some examples of the method, apparatuses, and non-transitory computer-readable medium described herein may further include operations, features, means, or instructions for determining the second frequency based on combining the first parameter and the second parameter.

Some examples of the method, apparatuses, and non-transitory computer-readable medium described herein may further include operations, features, means, or instructions for determining an initial downlink BWP that overlaps with the CORESET in frequency and performing a random access procedure over the initial downlink BWP based on transmitting the system information.

Some examples of the method, apparatuses, and non-transitory computer-readable medium described herein may further include operations, features, means, or instructions for transmitting at a third frequency a second SSB that indicates a fourth frequency of a second CORESET relative to the second SSB, where the fourth frequency may be based on one or more of: a bandwidth of the second CORESET, a combination of the first parameter associated with a first portion of the second SSB and the second parameter associated with a second portion of the second SSB, or both, where the SSB at least partially overlaps the second SSB in frequency, and where the second frequency and the fourth frequency may be configured such that the CORESET and the second CORESET may be non-overlapping in frequency based on the SSB overlapping with the second SSB, transmitting a second downlink control channel transmission over the second CORESET, and transmitting second SI based on the second downlink control channel transmission.

In some examples of the method, apparatuses, and non-transitory computer-readable medium described herein, the second frequency and the fourth frequency being configured such that the CORESET and the second CORESET may be non-overlapping in frequency includes the second frequency and the fourth frequency being associated with a same CORESET bandwidth and different SSB indices.

In some examples of the method, apparatuses, and non-transitory computer-readable medium described herein, the second frequency and the fourth frequency being configured such that the CORESET and the second CORESET may be non-overlapping in frequency includes a value of the first parameter of the first portion of the SSB being the same as the a value of the first parameter of the first portion of the second SSB and a value of the second parameter of the second portion of the SSB being different from a value of the second parameter of the second portion of the second SSB.

In some examples of the method, apparatuses, and non-transitory computer-readable medium described herein, the second frequency and the fourth frequency being configured such that the CORESET and the second CORESET may be non-overlapping in frequency includes the second frequency and the fourth frequency differing by at least the CORESET bandwidth.

In some examples of the method, apparatuses, and non-transitory computer-readable medium described herein, the first frequency and the third frequency include a same frequency.

DETAILED DESCRIPTION

Figure 1:
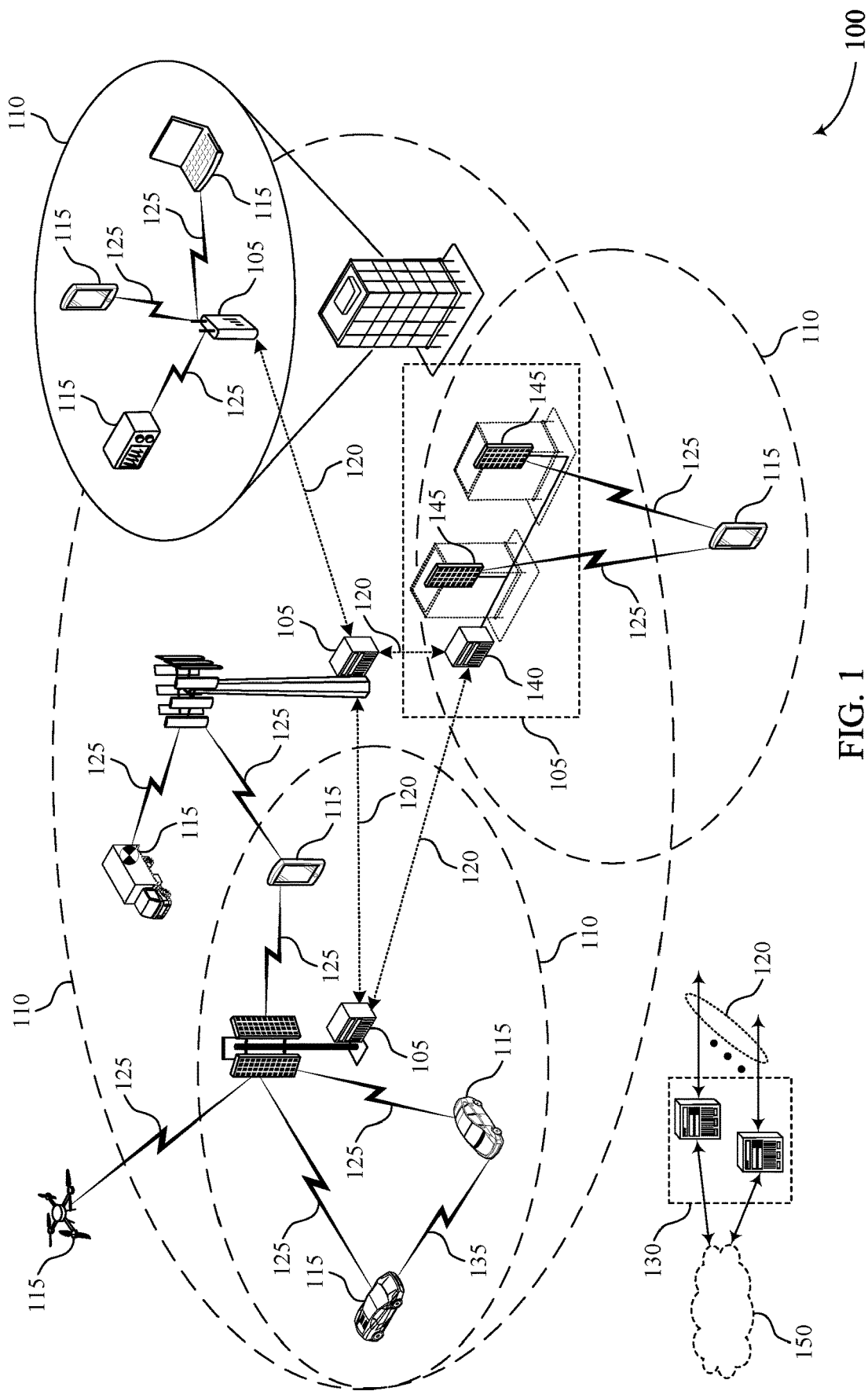
FIG. 1 illustrates an example of a wireless communications system that supports frequency configuration for control resource set (CORESET) in non-terrestrial networks (NTNs) in accordance with aspects of the present disclosure.

A non-terrestrial network (NTN) device or other base station may use multiple beams to communicate with multiple user equipment (UE), and each beam may operate on a disjoint frequency interval from at least one other beam (e.g., beams may have differing bandwidth parts (BWPs)). To enable a UE to gain access to the NTN device, the NTN device may transmit a synchronization signal block (SSB) to the UE. Once the UE decodes the SSB, the UE may determine a location and bandwidth of an initial control resource set (CORESET), which may also be referred to as CORESET #0. The UE may decode a physical downlink control channel (PDCCH) specified by initial CORESET, may determine resources for receiving a system information block (SIB), and may receive the SIB accordingly. The SIB may configure an initial downlink BWP and an initial uplink BWP which the UE may use to perform random access with the NTN device. The initial downlink BWP may include the frequencies spanned by the corresponding initial CORESET.

In some examples, the SSBs for different beams may be transmitted on a common frequency interval, which may enable UEs to perform initial cell search quicker. However, using a common frequency interval may result in the initial CORESETs for each SSB overlapping at least partially in frequency, as the initial CORESETs may have a value relative to their respective SSBs. As described herein, each initial downlink BWP for performing a random access procedure may include the frequencies of each respective initial CORESET. Thus, one or more of the initial downlink BWPs may overlap in frequency if one or more of the initial CORESETs overlap in frequency. As multiple UEs may perform a random access procedure over different initial downlink BWPs that overlap in frequency, there may be an increased chance that contention may occur (e.g., the transmissions received at or transmitted from the UEs may collide or interfere).

To mitigate contention that occurs at least partially due to overlap between CORESETs in frequency, the NTN device and UE may perform methods to enable the CORESETs to be disjoint from each other in frequency. For instance, the UE may use an offset that is based on a bandwidth of the initial CORESET and an SSB index configured such that CORESETs associated with neighboring beams do not overlap. Additionally, or alternatively, the UE may receive a first and second indicator from the SSB that the UE may combine to determine an offset for a CORESET such that the CORESET does not overlap with CORESETs associated with neighboring beams. Additionally, or alternatively, the UE may receive an offset that is configured such that the initial CORESET for the UE is different from the initial CORESET of a neighboring beam by at least a bandwidth of the initial CORESET of the neighboring beam.

Aspects of the disclosure are initially described in the context of wireless communications systems. Additional aspects of the disclosure are described in the context of CORESET offset schemes, a beam configuration scheme, and a process flow. Aspects of the disclosure are further illustrated by and described with reference to apparatus diagrams, system diagrams, and flowcharts that relate to frequency configuration for CORESET in NTNs.

FIG. 1 illustrates an example of a wireless communications system 100 that supports frequency configuration for CORESET in NTNs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In the wireless communications system 100 of FIG. 1, a UE 115 may communicate with a base station 105 via a NTN device. The UE 115 may be configured with an offset for a CORESET relative to an SSB based on a CORESET bandwidth, a combination of a first and second parameter associated with the SSB, or both. For example, an NTN device (e.g., a satellite, base station 105) may transmit, to a UE 115, at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both. The UE 115 may monitor the CORESET at the indicated second frequency for a downlink control channel transmission. The NTN device may transmit, to the UE 115, a downlink control channel transmission over the CORESET. The NTN device may transmit, to the UE 115, system information (SI) based on the downlink control channel transmission.

Figure 2:
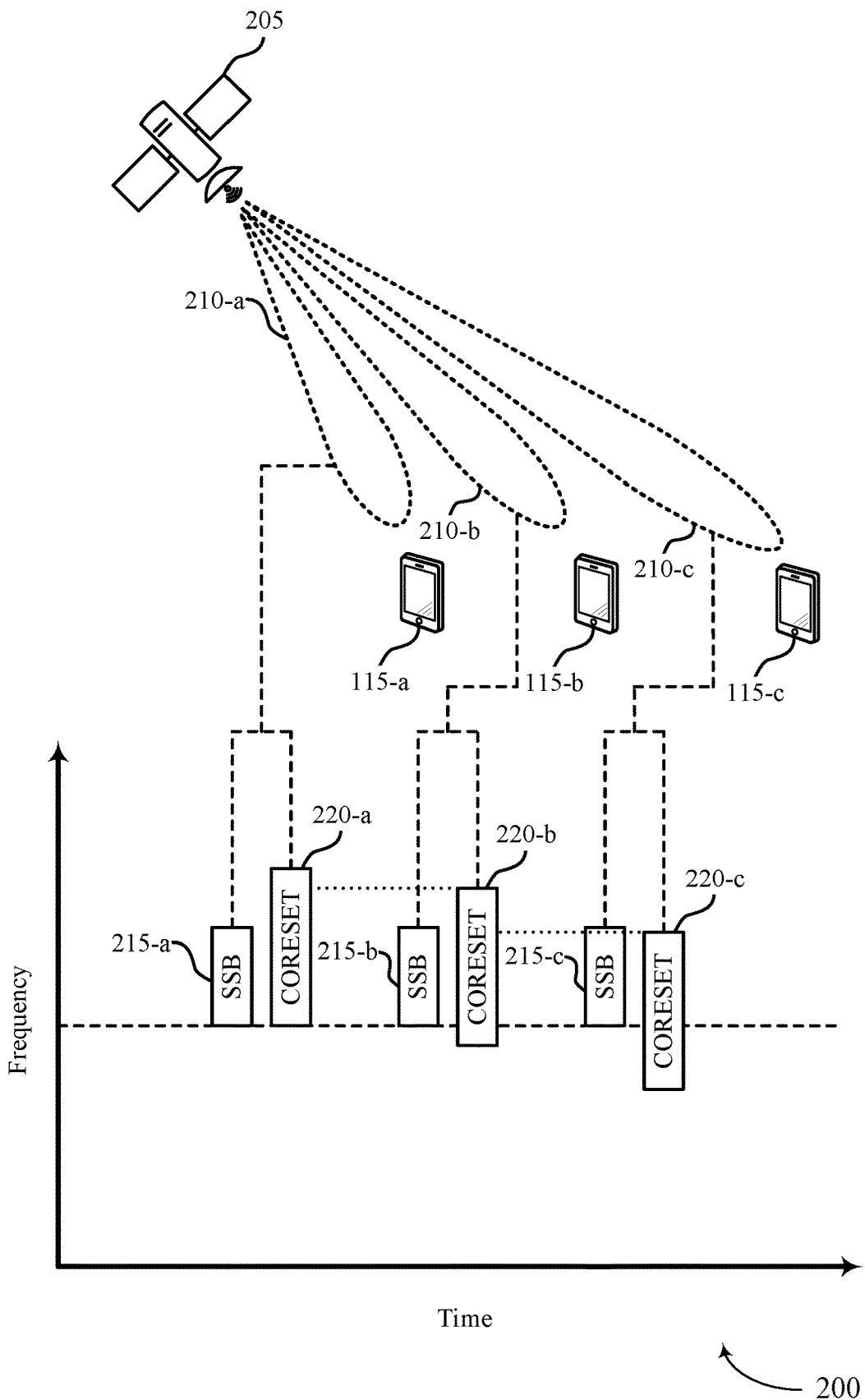
FIG. 2 illustrates an example of a wireless communications system that supports frequency configuration for CORESET in NTNs in accordance with aspects of the present disclosure.

FIG. 2 illustrates an example of a wireless communications system 200 that supports frequency configuration for CORESET in NTNs in accordance with aspects of the present disclosure. In some examples, wireless communications system 200 may implement aspects of wireless communications system 100. For example, UEs 115-*a*, 115-*b* and 115-*c* may be examples of UEs 115 as described with reference to FIG. 1.

In some examples, NTN device 205 may be an example of a satellite (e.g., a low-earth orbit (LEO) satellite) or a high-altitude platform station (HAPS) (e.g., a balloon). The NTN device 205 may use multiple antennas to form multiple beams 210 (e.g., multiple narrow beams). The beams 210 may operate on disjoint frequency intervals (e.g., may have different BWPs), which may provide interference mitigation. To lessen or minimize the occurrence of cell handover, the beams 210 from an NTN device 205 may be configured as a single cell.

In some examples, NTN device 205 may transmit an SSB 215 over one or more of the beams 210. A UE 115 may receive the SSB and may decode the SSB 215 to obtain a master information block (MIB) that indicates the frequency location and bandwidth of an initial coreset 220 (i.e., CORESET #0) and an initial search space (i.e., search space #0). The frequency location may be relative to a lowest frequency of the SSB 215. The UE 115 may decode a PDCCH transmission determined by (e.g., specified by) the initial CORESET 220 and the initial search space. The PDCCH transmission may allocate resources for a SIB (e.g., a SIB referred to as SIB1) on physical downlink shared channel (PDSCH). The UE 115 may receive and decode the SIB, which may configure an initial downlink BWP and an initial uplink BWP at the UE 115. The initial downlink BWP may include the initial CORESET 220. If the initial downlink BWP is not configured, the initial downlink BWP may have a same frequency interval as the initial CORESET 220. The UE 115 may perform random access on the initial uplink BWP and the initial downlink BWP.

The SSBs 215 for different beams 210 may be transmitted on a common frequency interval, which may enable UEs 115 to perform an initial cell search quicker. For instance, if a common frequency interval is represented as BWP 1, then a beam 210 may switch from a second frequency interval (i.e., BWP 2) to BWP 1 for transmitting the SSB 215.

As described herein, the location of the initial CORESET 220 may be equal to the SSB frequency plus an offset. In some examples, the offset may take one or more predefined values. For instance, if the SCS of the SSB 215 is 15 kHz and the SCS of the PDCCH is 15 kHz and the initial CORESET 220 has a bandwidth of 24 resource blocks (RB), the offset may be equal to 0 RBs, 2 RBs, or 4 RBs. Multiple beams from an NTN device 205 (e.g., a satellite, a HAPS) may be configured to be within a same cell. In cases where one initial downlink BWP is present per cell, overlap between multiple instances of the initial CORESET 220 may not occur. As such, offsets that differ from each other by amounts small enough such that overlap between CORESETs occurs (e.g., 0 RBs, 2 RBs, 4 RBs) may be used. However, in cases where there are multiple initial downlink BWPs per cell, overlap may occur if the offsets are too small. For instance, using the common frequency interval may result in overlapping initial downlink BWPs, even if the beams 210 have different CORESET #0 configurations in the MIBs (e.g., configured in an information element (IE) referred to as controlResourceSetZero). When multiple instances of the initial CORESET 220 overlap in frequency, the corresponding initial downlink BWPs may also overlap in frequency. When the initial downlink BWPs overlap with each other in frequency, contention between UEs 115 may occur more frequently.

In general a beam 210 may serve one or more UEs 115. For instance, the beam may cover an area as large as 100 km by 500 km and may serve multiple UEs 115 within that area. However, having too many UEs 115 on overlapping initial downlink BWPs may result in increased contention when the UEs 115 perform random access procedures on their respective initial downlink BWPs. The methods as described herein may enable downlink BWPs to be disjoint from each other (e.g., non-overlapping in frequency), which may distribute the random access traffic load in a manner that reduces contention.

In one example, NTN device 205 may transmit SSB 215-*a* to UE 115-*a* over beam 210-*a*, SSB 215-*b* to UE 115-*b* over beam 210-*b*, and SSB 215-*c* to UE 115-*c* over beam 210-*c*. SSB 215-*a* may indicate a frequency location for initial CORESET 220-*a*, SSB 215-*b* may indicate a frequency location for initial CORESET 220-*b*, and SSB 215-*c* may indicate a frequency location for initial CORESET 220-*c*. For instance, SSB 215-*a* may indicate a frequency offset of 0 RBs relative to SSB 215-a, SSB 215-b may indicate a frequency offset of 2 RBs relative to SSB 215-b, and SSB 215-c may indicate a frequency offset of 4 RBs relative to SSB 215-c. However, each initial CORESET 220 may have a bandwidth that is large enough such that initial CORESET 220-a overlaps with at least one of initial CORESETs 220-b and 220-c. As such, an initial downlink BWP associated with initial CORESET 220-a may overlap with an initial downlink BWP associated with one of initial CORESETs 220-b or 220-c. Thus, when UE 115-a performs a random access procedure over its respective initial downlink BWP, UE 115-a may be more likely to experience contention with UEs 115-b and/or 115-c.

An example of configurations for CORESET #0 may be given in the following table:

TABLE 1

CORESET #0 Configuration when {SSB SCS, PDCCH SCS} = {15 kHz, 15 kHz}

| Index | SS/PBCH Block and CORESET multiplexing pattern | Number of RBs | Number of Symbols | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 48 | 1 | 38 |
| 13 | 1 | 48 | 2 | 38 |
| 14 | 1 | 48 | 3 | 38 |
| 15 | Reserved | Reserved | Reserved | Reserved |

In a first example, to prevent overlap between CORESETs 220 (e.g., CORESET #0) over different beams 210, NTN device 205 may determine a frequency offset for the initial CORESET 220 relative to an SSB 215 based on an SSB index and a bandwidth of each CORESET 220. In such examples, a UE 115 may determine the frequency of CORESET 220 by adding the SSB frequency plus a frequency offset that is a function of the SSB index and the bandwidth of the CORESET 220 (e.g., the latter which may be referred to as $\Delta f$). The SSB index (e.g., ssb-index) may be numbered consecutively (e.g., 0, 1, 2, . . . 7).

In some examples, the bandwidth of the CORESET 220 may be pre-configured or may be obtained through another communication network (e.g., LTE). Additionally, or alternatively, the bandwidth may depend on a geographical location of the UE 115. For instance, if a UE 115 is located in or within a threshold distance of an urban area (e.g., an area with higher user density and/or population density), the magnitude of the offset may be larger than when the UE 115 is in or within a threshold distance of a rural area (e.g., an area with lower user density and/or population density). If a UE 115 receives multiple SSBs 215, the UE 115 may do soft combining in decoding the MIB of the SSB 215. Additionally, or alternatively, the offset may be indicated in a physical broadcast channel (PBCH) payload of an SSB 215. For instance, one spare bit in a MIB may be used to indicate the offset. The offset may equal a first bandwidth of an initial downlink BWP if the bit is 0 and may equal a second bandwidth (e.g., of an initial downlink BWP) if the bit is 1. Alternatively, the PBCH (e.g., which may include a MIB) in the SSB 215 may include additional bits, where each combination of the bits indicates a bandwidth of a downlink BWP, and that bandwidth may be assigned to the offset. The bits may be added to the MIB or may be outside the MIB but still in the PBCH payload (e.g., in physical layer bits). Additionally, or alternatively, each demodulation reference signal (DMRS) sequence associated with the SSB 215 may indicate a unique offset value.

In some examples, the CORESET 220 of non-neighboring beams 210 may use the same frequency, which may be referred to as frequency spatial reuse. In some such examples, the network (e.g., via NTN device 205) may signal a parameter N corresponding to frequency spatial reuse. In some examples, a UE 115 may use the parameter N to calculate or determine the frequency offset $\Delta f$. In some examples, the frequency location of the initial CORESET 220 may be determined as $SSB_{frequency}+\alpha*\text{modulus}(SSB_{index}N)*\Delta f$, where $SSB_{frequency}$ corresponds to a lowest frequency of an SSB 215, $\alpha$ has a value whose absolute value is greater than or equal to 1, $SSB_{index}$ corresponds to an SSB index associated with the SSB 215, N corresponds to frequency spatial reuse (e.g., N≥1, such as 4), and $\Delta f$ corresponds to the bandwidth of CORESET #0 and/or an associated initial downlink BWP. Additional details about the first example may be described elsewhere herein, for example, with reference to FIGS. 3, 4A, and 4B.

In a second example, a UE 115 may determine the frequency of an initial CORESET 220 as a frequency of an SSB 215 plus an offset which is a function (e.g., a combination) of two or more parameters, each indicated by an indicator (e.g., in the SSB 215). For instance, a first indicator may be associated with a first portion of the SSB 215 (e.g., a first field of the SSB 215) and may indicate a first parameter and a second identifier may be associated with a second portion of the SSB 215 (e.g., a second field of the SSB 215) and may indicate a second parameter. The first parameter may, for instance, be a frequency offset derived from an IE in a MIB of the SSB 215 (e.g., a controlResourceSetZero IE). The second indicator, if present, may be carried in a PBCH transmission associated with the SSB 215. For instance, one spare bit in a MIB may be used to indicate the second parameter. The second parameter may equal 1 if the bit is 0 and may equal a number greater than 1 if the bit is 1. Alternatively, a PBCH (e.g., which may include a MIB) associated with the SSB 215 may include additional bits, where each combination of the bits indicates a unique value of the second parameter. The bits may be added to the MIB or may be outside the MIB but still in the PBCH payload (e.g., in physical layer bits). Additionally, or alternatively, each DMRS sequence associated with the SSB 215 may indicate a unique value for the second parameter. Alternatively, if the second indicator is absent, the second parameter may be set to a function of the bandwidth of the initial CORESET 220, where the bandwidth may be indicated by the CORESET #0 configuration (the IE controlResourceSetZero) in the MIB of an SSB 215. In some examples, the CORESET #0 location may be calculated as $SSB_{frequency}+\text{first\_parameter}*\text{second\_parameter}$, where $SSB_{frequency}$ may be the lowest frequency of the SSB 215, first_parameter may be a frequency offset derived from an IE in the MIB (e.g., controlResourceSetZero), and second_parameter may be a non-negative integer indicated by the second indicator. Additional details about the second example may be described elsewhere herein, for example, with reference to FIG. 3.

In a third example, the network (e.g., NTN device 205) may configure the offsets of initial CORESETs 220 based on the bandwidths of the initial CORESETs. For instance, the frequency occupied by an nth initial CORESET 220 may be represented by the interval $F_n=[f_{Ssb}+\text{of } f_n, f_{SSB}+\text{of } f_n, BW_n]$, where $f_{SSB}$ may be the lowest frequency of an SSB 215, of $f_n$ may be a frequency offset for the nth initial CORESET 220, and $BW_n$ may be the bandwidth of the nth initial CORESET 220. The NTN device may configure frequency offsets on the condition where of $f_{n+1}$–of $f_n \geq BW_n$. Configuring the frequency offset in this manner may ensure that $F_{n+1}$ and $F_n$ do not overlap (e.g., may ensure that possible initial CORESETs 220 do not overlap in frequency). Additional details about the third example may be described elsewhere herein, for example, with reference to FIG. 3.

By enabling CORESETs to be disjoint from each other in frequency, the methods as described herein may reduce the occurrence of contention when UEs communicating over beams 210 are performing a random access procedure. Reducing contention may improve the efficiency of performing communications.

Figure 3:
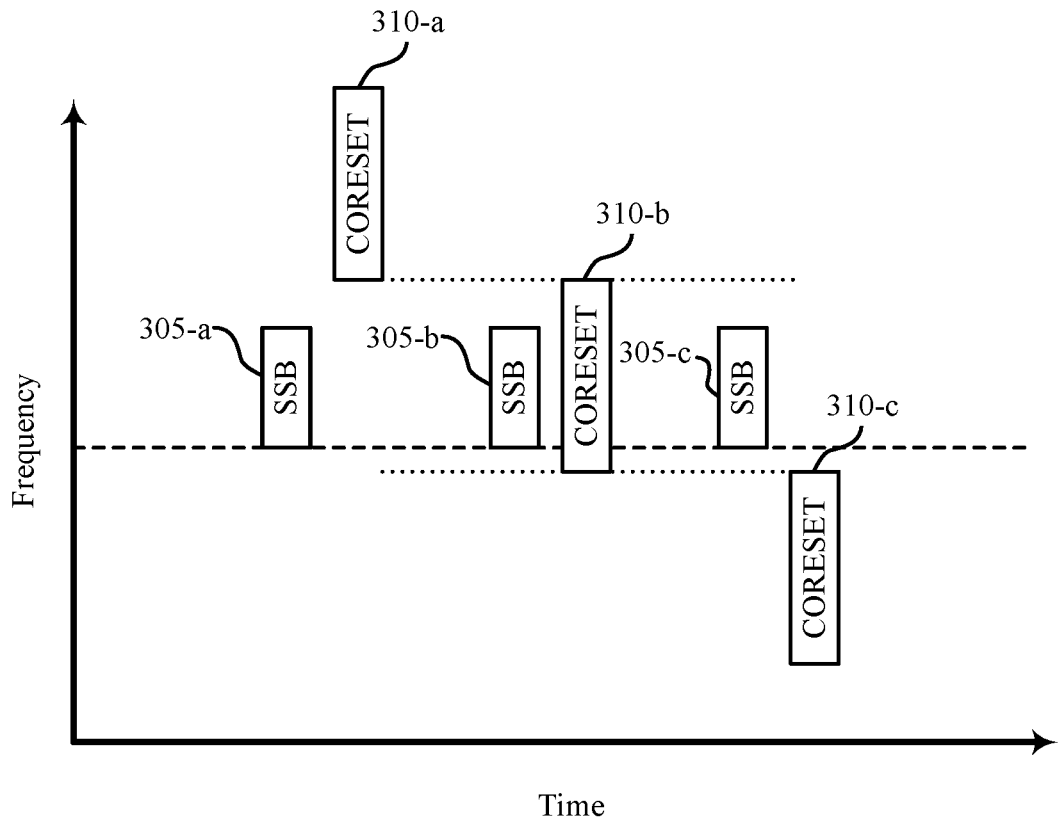
FIG. 3 illustrates an example of a CORESET offset scheme that supports frequency configuration for CORESET in NTNs in accordance with aspects of the present disclosure.

FIG. 3 illustrates an example of a CORESET offset scheme 300 that supports frequency configuration for CORESET in NTNs in accordance with aspects of the present disclosure. In some examples, CORESET offset scheme 300 may implement aspects of wireless communications systems 100 and/or 200. For example, CORESET offset scheme 300 may represent a communications scheme implemented by an NTN device 205 such that CORESETs 220 configured at neighboring beams 210 are offset from each other in a frequency non-overlapping fashion.

A first UE 115 may receive SSB 305-a, where SSB 305-a may indicate a frequency location for initial CORESET 310-a. A second UE 115 may receive SSB 305-b, where SSB 305-b may indicate a frequency location for initial CORESET 310-b. A third UE 115 may receive SSB 305-c, where SSB 305-c may indicate a frequency location for initial CORESET 310-c.

According to the first example (e.g., as described with reference to FIG. 2), the SSBs 305-a, 305-b, and 305-c may indicate a respective SSB index and CORESET bandwidth Δf. In some examples, the CORESET bandwidth Δf indicated by each SSB 305 may be the same, but the SSB indices may differ. Accordingly, the frequency location for initial CORESET 310-a may differ from the frequency locations for initial CORESETs 310-b and 310-c such that CORESETs 310-a, 310-b, and 310-c are non-overlapping in frequency.

Additionally, or alternatively, according to the second example (e.g., as described with reference to FIG. 2), the SSBs 305-a, 305-b, and 305-c may indicate a first indicator corresponding to a first parameter and a second indicator corresponding to a second parameter. In some examples, the value of the first parameter indicated by the first indicator for each SSB 305 may be the same, but the value of the second parameter may differ.

Accordingly, the frequency location of initial CORESET 310-a may differ from the frequency locations for initial CORESETs 310-b and 310-c such that CORESETs 310-a, 310-b, and 310-c are non-overlapping in frequency.

Additionally, or alternatively, according to the third example (e.g., as described with reference to FIG. 2), the SSBs 305-a, 305-b, and 305-c may indicate offsets configured according to the condition of $f_{n+1}$–of $f_n \geq BW_n$. As such, the frequency location of initial CORESET 310-a may differ from the frequency locations for initial CORESETs 310-b and 310-c such that CORESETs 310-a, 310-b, and 310-c are non-overlapping in frequency.

Figure 4A:
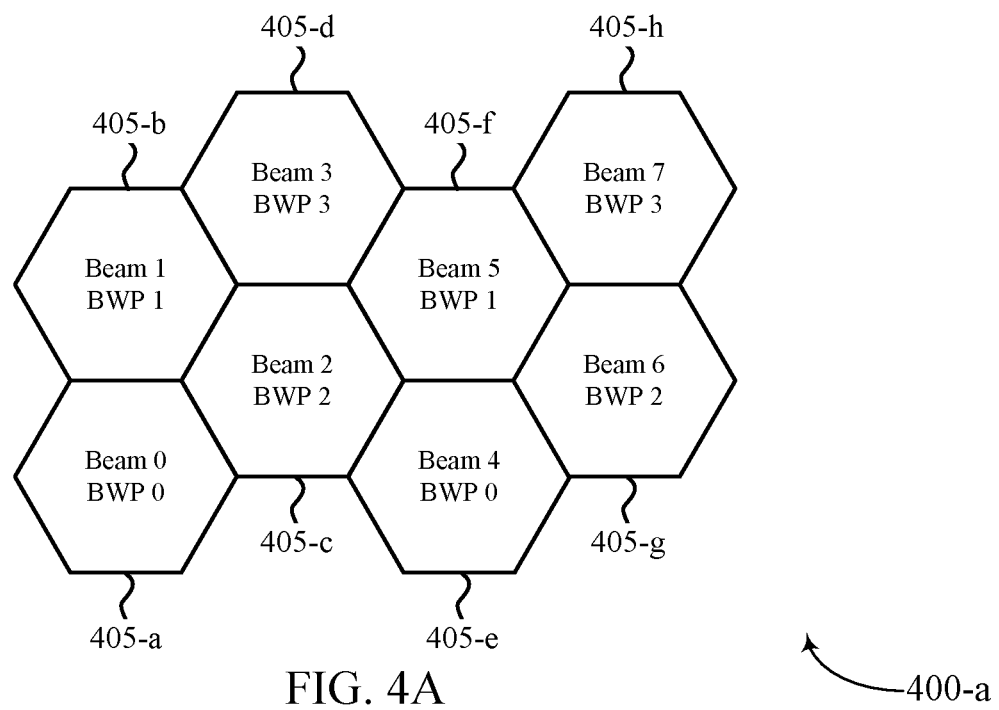
FIG. 4A illustrates an example of a beam configuration scheme that supports frequency configuration for CORESET in NTNs in accordance with aspects of the present disclosure.
Figure 4B:
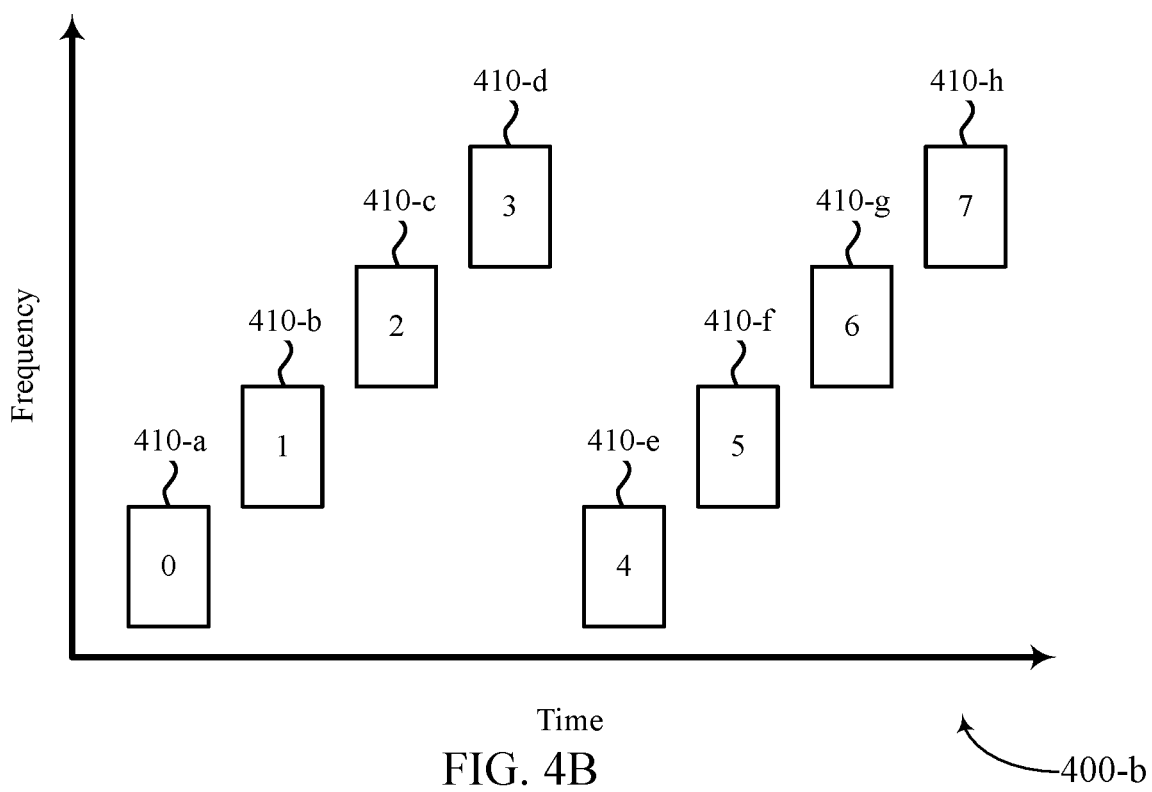
FIG. 4B illustrates an example of a CORESET offset scheme that supports frequency configuration for CORESET in NTNs in accordance with aspects of the present disclosure.

FIG. 4A illustrates an example of a beam configuration scheme 400-a and FIG. 4B illustrates an example of a CORESET offset scheme 400-b that supports frequency configuration for CORESET in NTNs in accordance with aspects of the present disclosure. In some examples, beam configuration scheme 400-a and CORESET offset scheme 400-b may implement aspects of wireless communications systems 100 and/or 200. For instance, beam configuration scheme 400-a may represent a configuration of beams for an NTN device 205 and CORESET offset scheme 400-b may represent a communications scheme implemented by an NTN device 205 such that CORESETs configured at neighboring beams 210 are offset from each other in a frequency non-overlapping fashion.

In the present example, an NTN device 205 may have eight beams 405 (e.g., 405-a, 405-b, 405-c, 405-d, 405-e, 405-f, 405-g, and 405-h). Beams 405-a and 405-e may operate in a first BWP (i.e., BWP 0); beams 405-b and 405-f may operate in a second BWP (i.e., BWP 1); beams 405-c and 405-g may operate in a third BWP (i.e., BWP 2); and beams 405-d and 405-h may operate in a fourth BWP (i.e., BWP 3).

Beams 405-a, 405-b, 405-c, 405-d, 405-e, 405-f, 405-g, and 405-h may transmit respective SSBs that indicate frequency locations for CORESETs 410-a, 410-b, 410-c, 410-d, 410-e, 410-f, 410-g, and 410-h, respectively. According to the methods described with reference to the first example in FIG. 2, CORESETs 410-a, 410-b, 410-c, and 410-d may each be disjoint in frequency from one another and CORESETs 410-e, 410-f, 410-g, and 410-h may likewise be disjoint from each other in frequency from one another (e.g., due to being associated with different SSB indices). However, overlap in frequency may occur between CORESETs 410-a and 410-e; 410-b and 410-f; 410-c and 410-g; and 410-d and 410-h (e.g., due to the frequency spatial reuse N being equal to 4).

Figure 5:
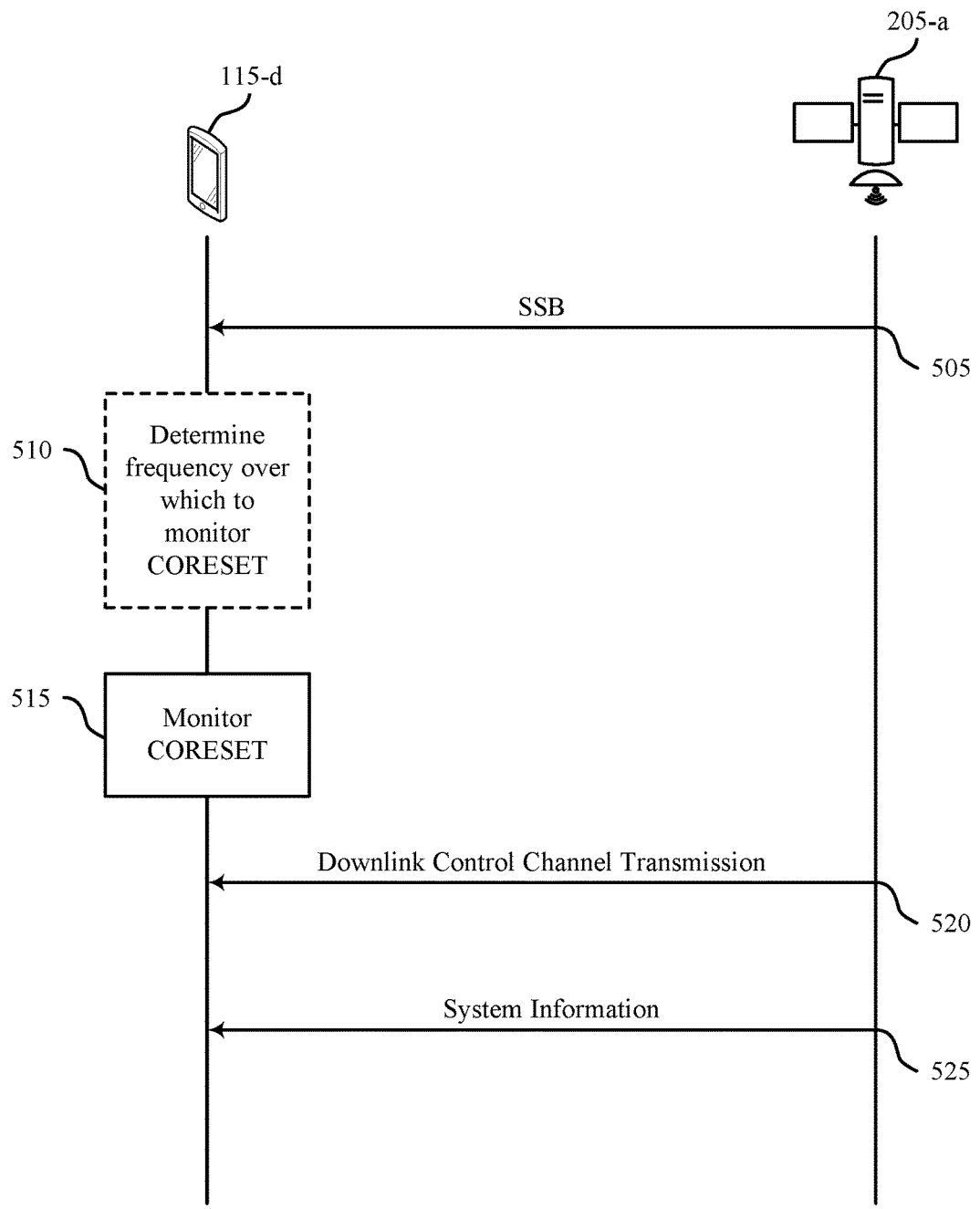
FIG. 5 illustrates an example of a process flow that supports frequency configuration for CORESET in NTNs in accordance with aspects of the present disclosure.

FIG. 5 illustrates an example of a process flow 500 that supports frequency configuration for CORESET in NTNs in accordance with aspects of the present disclosure. In some examples, process flow 500 may implement aspects of wireless communications systems 100 and/or 200. For example, UE 115-d may be an example of a UE 115 as described with reference to FIG. 1 and NTN device 205-a may be an example of an NTN device 205 as described with reference to FIG. 2.

At 505, NTN device 205-a may transmit at a first frequency an SSB that indicates a second frequency of a CORESET relative to the SSB. The second frequency may be based on one or more of: a CORESET bandwidth, a combination of a first parameter associated with a first portion of the SSB and a second parameter associated with a second portion of the SSB, or both. UE 115-d. In some examples, receiving at the first frequency the SSB may include UE 115-d receiving an indication of a frequency offset, where the frequency offset is based on the CORESET bandwidth. In some examples, the frequency offset may be based on an SSB index, a user density at or within a threshold distance of a geographic location of UE 115-d, or both. In some examples, receiving the indication of the frequency offset may include receiving a MIB of the SSB, where the MIB includes the indication of the frequency offset. In some such examples, the indication of the frequency offset may include an explicit indication of the frequency offset (e.g., a field of the MIB indicating the frequency offset). In some examples, the SSB may be associated with a DMRS sequence that maps to the second frequency or to the frequency offset. In some examples, the CORESET bandwidth may include a bandwidth of the CORESET.

In some examples NTN device 205-*a* may transmit and UE 115-*d* may receive at the first frequency a second SSB prior to the SSB. In some such examples, the second SSB may indicate a third frequency of a second CORESET relative to the second SSB, where the CORESET bandwidth includes a bandwidth of the second CORESET. In some examples, UE 115-*d* may receive a MIB, where the first portion of the SSB includes a first field of the MIB. In some such examples, the second portion of the SSB includes one or more of: a spare bit of the MIB, a second field of the MIB, or a field of a PBCH transmission that is outside of the MIB. In some such examples, the first field of the MIB is associated with the CORESET. In some examples, the SSB is associated with a DMRS sequence that maps to the second parameter. In some examples, UE 115-*d* may determine that the second parameter is absent from the SSB and may determine the second parameter based on the CORESET bandwidth and the absence of the second parameter from the SSB. In some examples, UE 115-*d* determining the frequency offset may include UE 115-*d* combining the first parameter and the second parameter. In some such examples, NTN device 205-*a* may transmit and UE 115-*d* may receive a second downlink control channel transmission over the second CORESET. Additionally, NTN device 205-*a* may transmit UE 115-*d* may receive second SI based on the second downlink control channel transmission.

In some examples, the second frequency and the fourth frequency being configured such that the CORESET and the second CORESET are non-overlapping in frequency includes the second frequency and the fourth frequency being associated with a same CORESET bandwidth and different SSB indices. In some examples, the second frequency and the fourth frequency being configured such that the CORESET and the second CORESET are non-overlapping in frequency includes a value of the first parameter of the first portion of the SSB being the same as a value of the first parameter of the first portion of the second SSB, and a value of the second parameter of the second portion of the SSB being different from a value of the second parameter of the second portion of the second SSB. In some examples, the second frequency and the fourth frequency being configured such that the CORESET and the second CORESET are non-overlapping in frequency includes the second frequency and the fourth frequency differing at least the CORESET bandwidth. In some examples, the first frequency and the third frequency include a same frequency.

In some examples, NTN device 205-*a* may transmit at a third frequency a second SSB that indicates a fourth frequency of a second CORESET relative to the second SSB, where the fourth frequency is based on one or more of: a bandwidth of the second CORESET, a combination of the first parameter associated with a first portion of the second SSB and the second parameter associated with a second portion of the second SSB, or both. In some such examples, the SSB block at least partially overlaps the second SSB in frequency and the second frequency and the fourth frequency are configured such that the CORESET and the second CORESET are non-overlapping in frequency based on the SSB overlapping with the second SSB.

At 510, UE 115-*d* may determine the second frequency. In some examples, UE 115-*d* may determine the second frequency based on the first frequency and a received frequency offset. Additionally, or alternatively, UE 115-*d* may determine a frequency offset based on the combination of the first parameter and the second parameter and may determine the second frequency based on the first frequency and the frequency offset.

At 515, UE 115-*d* may monitor the CORESET at the indicated second frequency for a downlink control channel transmission.

At 520, NTN device 205-*a* may transmit a downlink control channel transmission (e.g., a PDCCH transmission) over the CORESET. UE 115-*d* may receive the downlink control channel transmission.

At 525, NTN device 205-*a* may transmit SI (e.g., a SIB) based on the downlink control channel transmission.

In some examples, UE 115-*d* may determine an initial downlink BWP that overlaps with the CORESET in frequency based on receiving the system information. In some examples, UE 115-*d* may perform a random access procedure over the initial downlink BWP.

Figure 6:
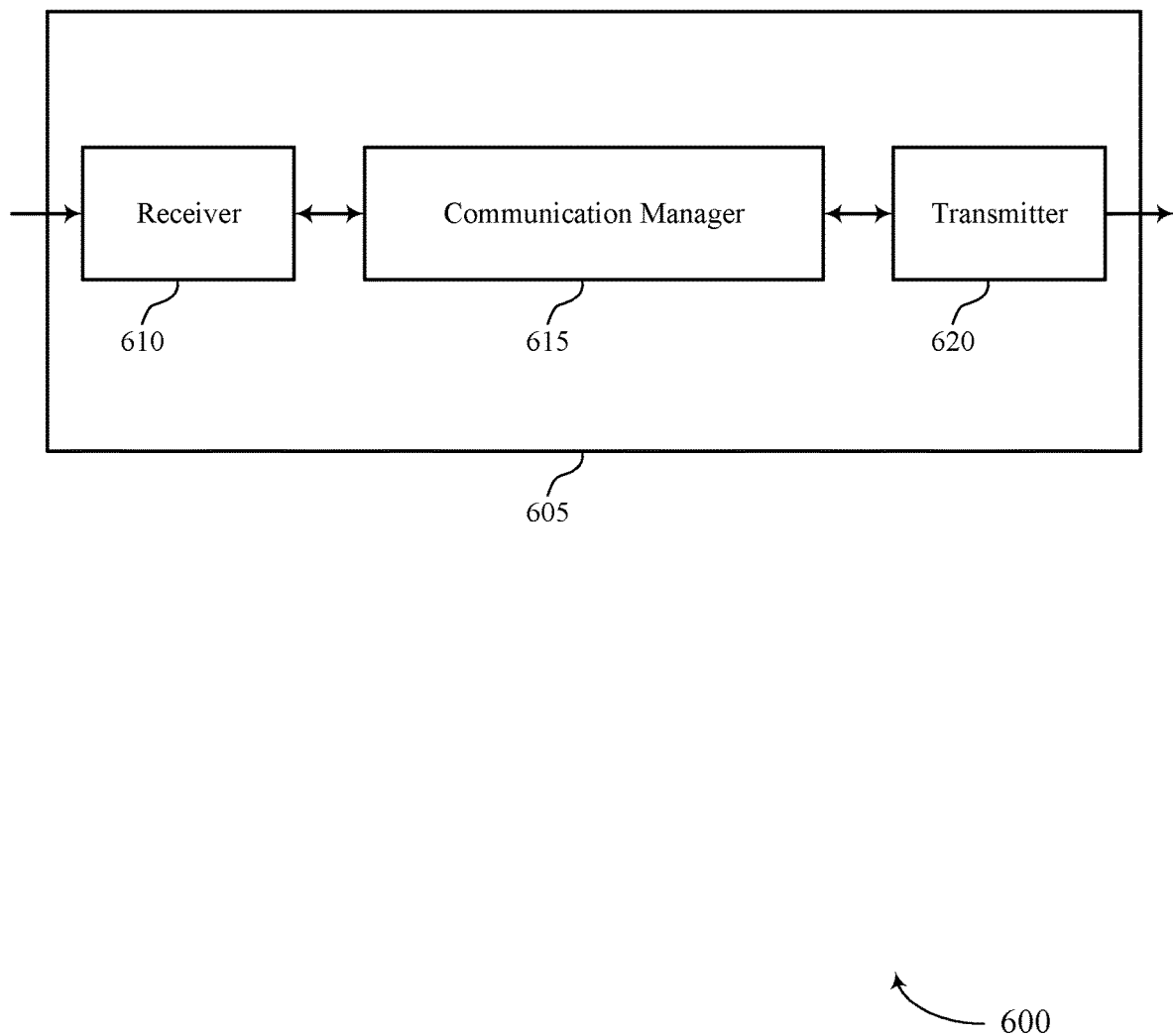
FIGS. 6 and 7 show block diagrams of devices that support frequency configuration for CORESET in NTNs in accordance with aspects of the present disclosure.

FIG. 6 shows a block diagram 600 of a device 605 that supports frequency configuration for CORESET in NTNs in accordance with aspects of the present disclosure. The device 605 may be an example of aspects of a UE 115 as described herein. The device 605 may include a receiver 610, a communication manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to frequency configuration for CORESET in NTNs, etc.). Information may be passed on to other components of the device 605. The receiver 610 may be an example of aspects of the transceiver 915 described with reference to FIG. 9. The receiver 610 may utilize a single antenna or a set of antennas.

The communication manager 615 may receive at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both; monitor the CORESET at the indicated second frequency for a downlink control channel transmission; and receive SI based on the downlink control channel transmission. The communication manager 615 may be an example of aspects of the communication manager 910 described herein.

The communication manager 615, or its sub-components, may be implemented in hardware, code (e.g., software or firmware) executed by a processor, or any combination thereof. If implemented in code executed by a processor, the functions of the communication manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 615, or its sub-components, may be physically located at various positions, including being distributed such that portions of functions are implemented at different physical locations by one or more physical components. In some examples, the communication manager 615, or its sub-components, may be a separate and distinct component in accordance with various aspects of the present disclosure. In some examples, the communication manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 915 described with reference to FIG. 9. The transmitter 620 may utilize a single antenna or a set of antennas.

In some examples, the methods performed by the device 605 may have one or more advantages. For instance, by receiving an SSB that indicates an offset based on the CORESET bandwidth or the combination of the first and second parameters, the device 605 may be less likely to experience contention with another wireless device (e.g., a UE 115) when performing a random access procedure. As such, on average, the device 605 may perform the random access procedure more quickly (e.g., the random access procedure may be associated with less latency or a reduced signaling overhead).

Figure 7:
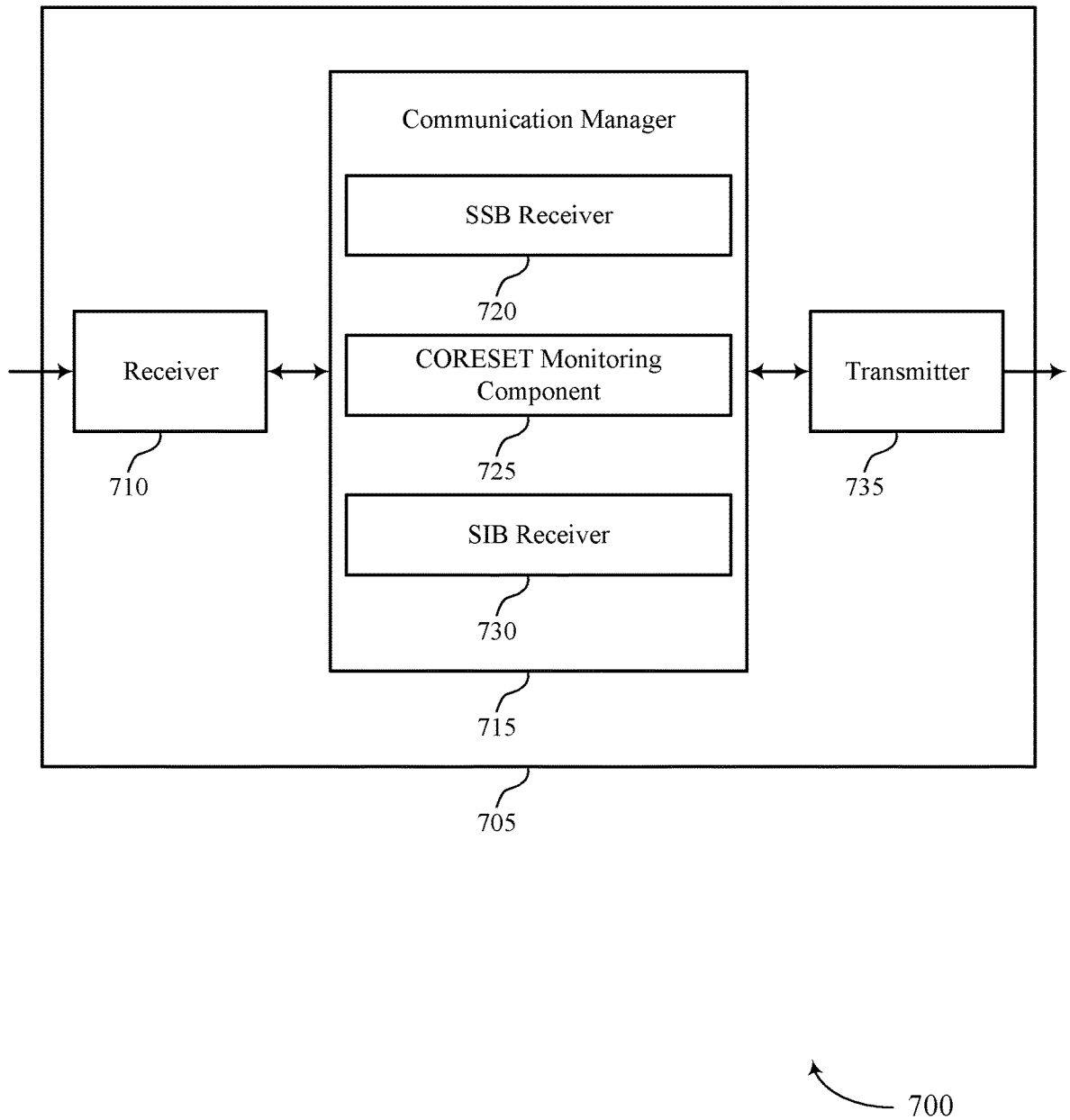

FIG. 7 shows a block diagram 700 of a device 705 that supports frequency configuration for CORESET in NTNs in accordance with aspects of the present disclosure. The device 705 may be an example of aspects of a device 605, or a UE 115 as described herein. The device 705 may include a receiver 710, a communication manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to frequency configuration for CORESET in NTNs, etc.). Information may be passed on to other components of the device 705. The receiver 710 may be an example of aspects of the transceiver 915 described with reference to FIG. 9. The receiver 710 may utilize a single antenna or a set of antennas.

The communication manager 715 may be an example of aspects of the communication manager 615 as described herein. The communication manager 715 may include an SSB receiver 720, a CORESET monitoring component 725, and a SIB receiver 730. The communication manager 715 may be an example of aspects of the communication manager 910 described herein.

The SSB receiver 720 may receive at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both.

The CORESET monitoring component 725 may monitor the CORESET at the indicated second frequency for a downlink control channel transmission.

The SIB receiver 730 may receive SI based on the downlink control channel transmission.

The transmitter 735 may transmit signals generated by other components of the device 705. In some examples, the transmitter 735 may be collocated with a receiver 710 in a transceiver module. For example, the transmitter 735 may be an example of aspects of the transceiver 915 described with reference to FIG. 9. The transmitter 735 may utilize a single antenna or a set of antennas.

Figure 8:
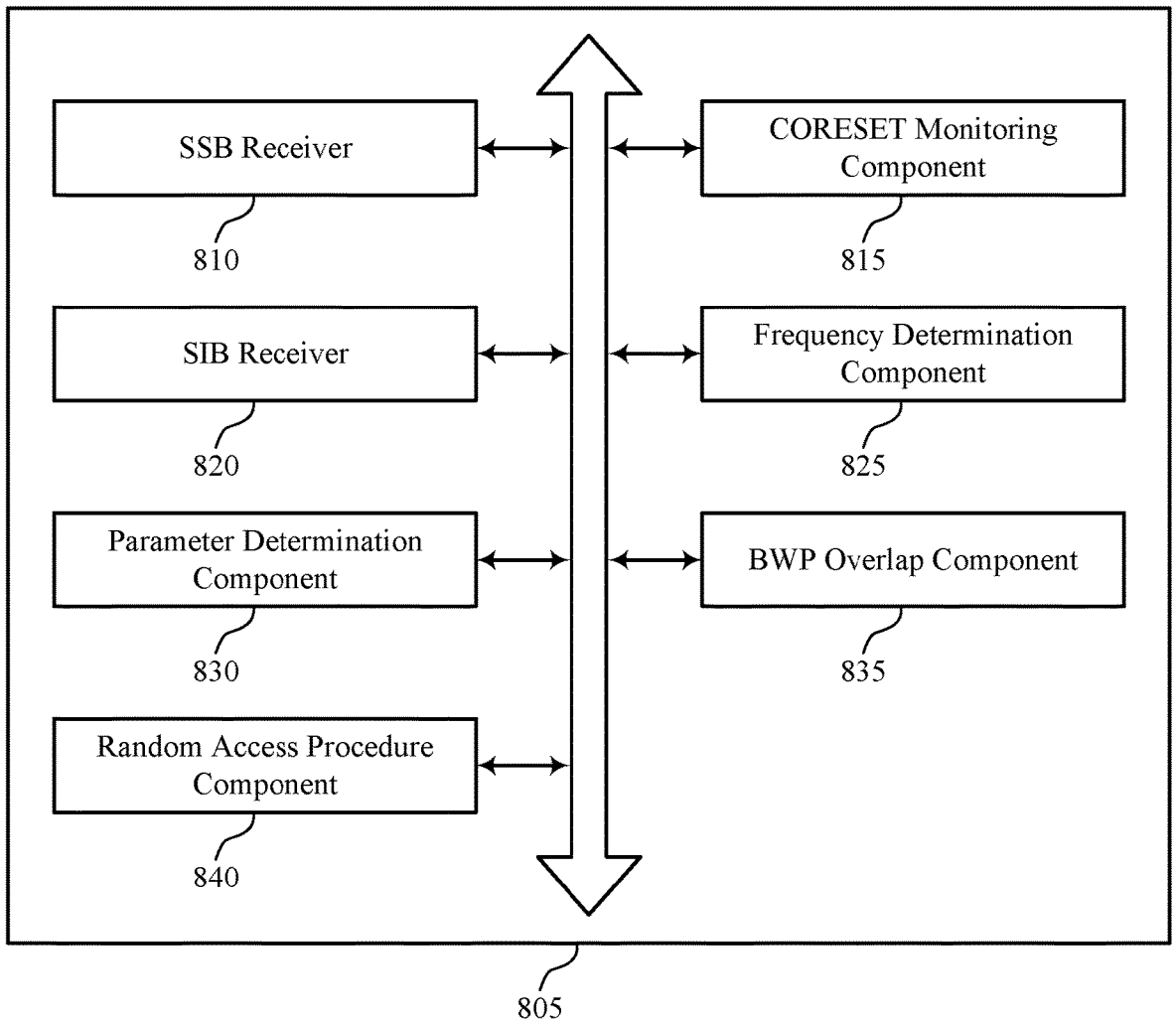
FIG. 8 shows a block diagram of a communication manager that supports frequency configuration for CORESET in NTNs in accordance with aspects of the present disclosure.

FIG. 8 shows a block diagram 800 of a communication manager 805 that supports frequency configuration for CORESET in NTNs in accordance with aspects of the present disclosure. The communication manager 805 may be an example of aspects of a communication manager 615, a communication manager 715, or a communication manager 910 described herein. The communication manager 805 may include an SSB receiver 810, a CORESET monitoring component 815, a SIB receiver 820, a frequency determination component 825, a parameter determination component 830, a BWP overlap component 835, and a random access procedure component 840. Each of these modules may communicate, directly or indirectly, with one another (e.g., via one or more buses).

The SSB receiver 810 may receive at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both. In some examples, the SSB receiver 810 may receive an indication of a frequency offset, where the frequency offset is based on the CORESET bandwidth. In some examples, the frequency offset is further based on an SSB index. In some examples, the frequency offset is further based on a user density at or within a threshold distance of a geographic location of the UE.

In some examples, the SSB receiver 810 may receive a MIB of the SSB, where the MIB includes the indication of the frequency offset. In some cases, the indication of the frequency offset includes an explicit indication of the frequency offset. In some examples, the SSB is associated with a DMRS sequence that maps to the second frequency. In some cases, the CORESET bandwidth includes a bandwidth of the CORESET. In some examples, the SSB receiver 810 may receive at the first frequency a second SSB prior to the SSB, where the second SSB indicates a third frequency of a second CORESET relative to the second SSB, where the CORESET bandwidth includes a bandwidth of the second CORESET.

In some examples, the SSB receiver 810 may receive a MIB, where the first portion of the SSB includes a first field of the MIB, and where the second portion of the SSB includes one or more of: a spare bit of the MIB, a second field of the MIB, or a field of a PBCH transmission that is outside of the MIB. In some examples, the first field of the MIB is associated with CORESET. In some examples, the SSB is associated with a DMRS sequence that maps to the second parameter.

The CORESET monitoring component 815 may monitor the CORESET at the indicated second frequency for a downlink control channel transmission.

The SIB receiver 820 may receive SI based on the downlink control channel transmission.

The frequency determination component 825 may determine the second frequency based on the first frequency and the received frequency offset. In some examples, the frequency determination component 825 may determine a frequency offset based on the combination of the first parameter associated with the first portion of the SSB and the second parameter associated with the second portion of the SSB. In some examples, the frequency determination component 825 may determine the second frequency based on the first frequency and the frequency offset. In some examples, the frequency determination component 825 may combine the first parameter and the second parameter.

The parameter determination component 830 may determine that the second parameter is absent from the SSB. In some examples, the parameter determination component 830 may determine the second parameter based on the CORESET bandwidth and the absence of the second parameter from the SSB.

The BWP overlap component 835 may determine an initial downlink BWP that overlaps with the CORESET in frequency based on receiving the system information.

The random access procedure component 840 may perform a random access procedure over the initial downlink BWP.

Figure 9:
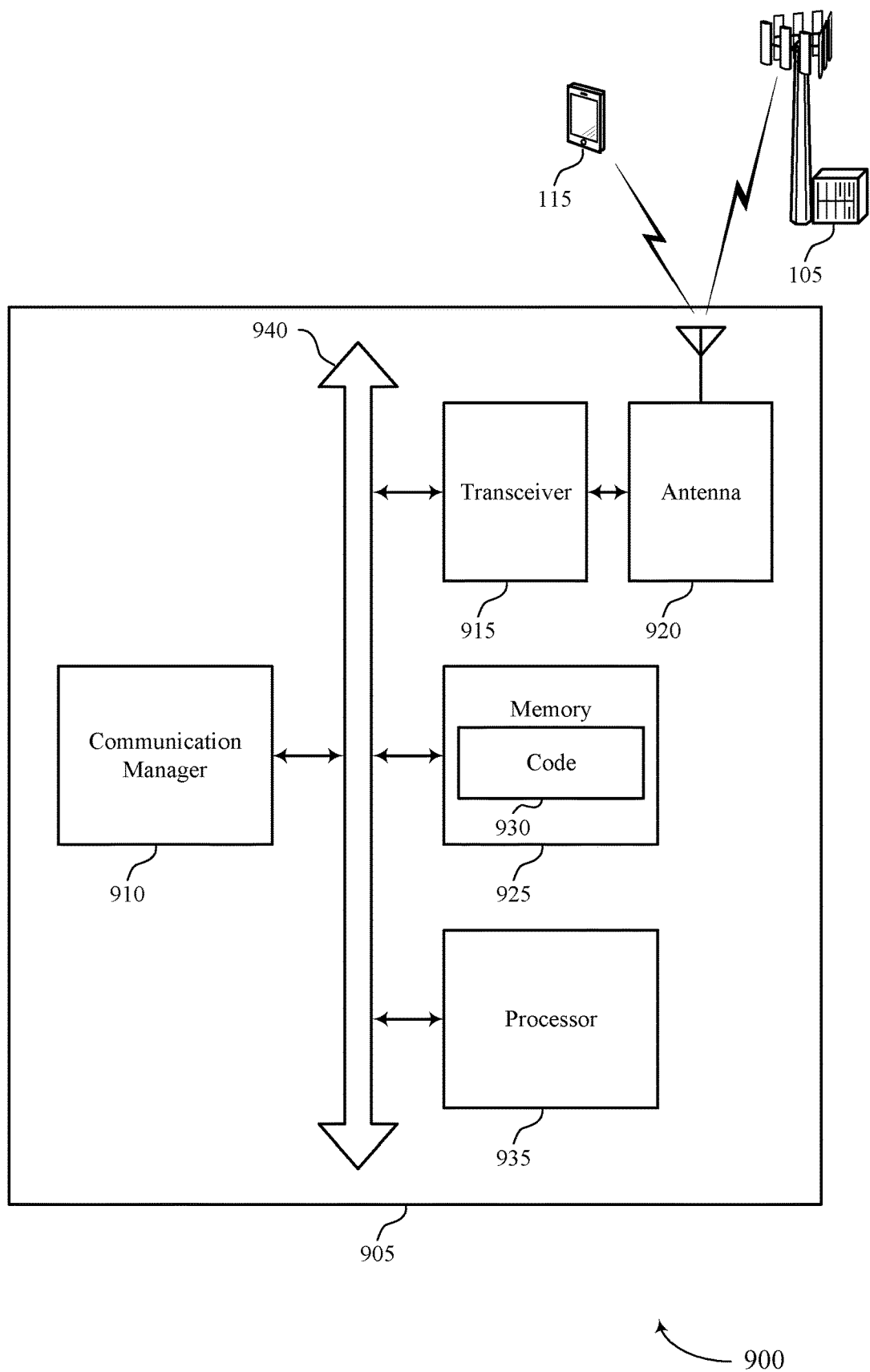
FIG. 9 shows a diagram of a system including a device that supports frequency configuration for CORESET in NTNs in accordance with aspects of the present disclosure.

FIG. 9 shows a diagram of a system 900 including a device 905 that supports frequency configuration for CORESET in NTNs in accordance with aspects of the present disclosure. The device 905 may be an example of or include the components of device 605, device 705, or a UE 115 as described herein. The device 905 may include components for bi-directional voice and data communications including components for transmitting and receiving communications, including a communication manager 910, a transceiver 915, an antenna 920, memory 925, and a processor 935. These components may be in electronic communication via or coupled with one or more buses (e.g., bus 940).

The communication manager 910 may receive at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both; monitor the CORESET at the indicated second frequency for a downlink control channel transmission; and receive SI based on the downlink control channel transmission.

The transceiver 915 may communicate bi-directionally, via one or more antennas, wired, or wireless links as described above. For example, the transceiver 915 may represent a wireless transceiver and may communicate bi-directionally with another wireless transceiver. The transceiver 915 may also include a modem to modulate the packets and provide the modulated packets to the antennas for transmission, and to demodulate packets received from the antennas.

In some cases, the wireless device may include a single antenna 920. However, in some cases the device may have more than one antenna 920, which may be capable of concurrently transmitting or receiving multiple wireless transmissions.

The memory 925 may include random-access memory (RAM) and read-only memory (ROM). The memory 925 may store computer-readable, computer-executable code 930 including instructions that, when executed, cause the processor to perform various functions described herein. In some cases, the memory 925 may contain, among other things, a basic 10 system (BIOS) which may control basic hardware or software operation such as the interaction with peripheral components or devices.

The code 930 may include instructions to implement aspects of the present disclosure, including instructions to support wireless communications. The code 930 may be stored in a non-transitory computer-readable medium such as system memory or other type of memory. In some cases, the code 930 may not be directly executable by the processor 935 but may cause a computer (e.g., when compiled and executed) to perform functions described herein.

The processor 935 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 935 may be configured to operate a memory array using a memory controller. In other cases, a memory controller may be integrated into the processor 935. The processor 935 may be configured to execute computer-readable instructions stored in a memory (e.g., the memory 925) to cause the device 905 to perform various functions (e.g., functions or tasks supporting frequency configuration for CORESET in NTNs).

In some examples, the methods performed by the device 905 may have one or more advantages. For instance, by receiving an SSB that indicates an offset based on the CORESET bandwidth or the combination of the first and second parameters, the device 905 may be less likely to experience contention with another wireless device (e.g., a UE 115) when performing a random access procedure. As such, on average, the device 905 may perform the random access procedure more quickly (e.g., the random access procedure may be associated with less latency or a reduced signaling overhead).

Figure 10:
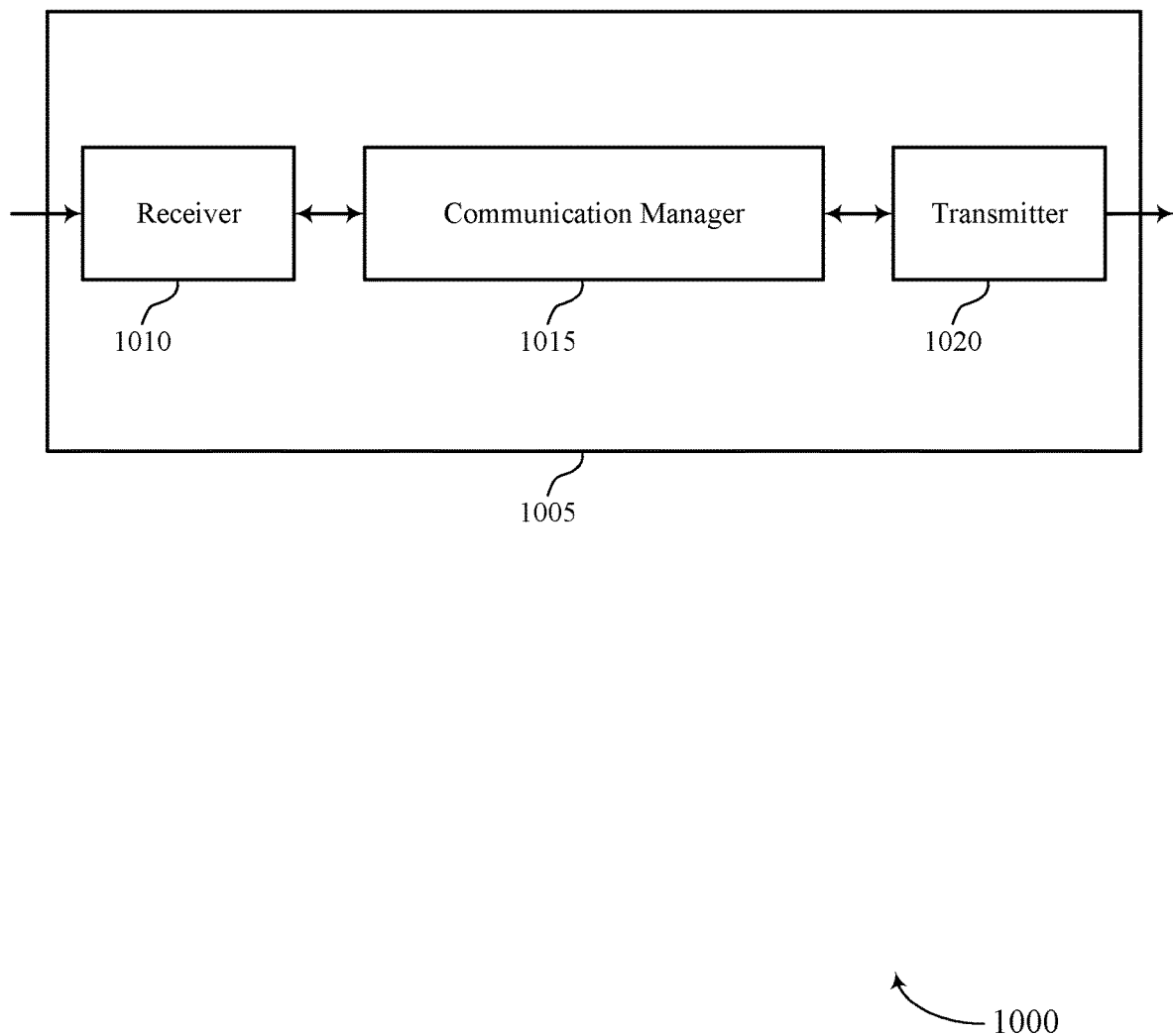
FIGS. 10 and 11 show block diagrams of devices that support frequency configuration for CORESET in NTNs in accordance with aspects of the present disclosure.

FIG. 10 shows a block diagram 1000 of a device 1005 that supports frequency configuration for CORESET in NTNs in accordance with aspects of the present disclosure. The device 1005 may be an example of aspects of a base station 105 and/or an NTN device 205 as described herein. The device 1005 may include a receiver 1010, a communication manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to frequency configuration for CORESET in NTNs, etc.). Information may be passed on to other components of the device 1005. The receiver 1010 may be an example of aspects of the transceiver 1320 described with reference to FIG. 13. The receiver 1010 may utilize a single antenna or a set of antennas.

The communication manager 1015 may transmit at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both; transmit a downlink control channel transmission over the CORESET; and transmit SI based on the downlink control channel transmission. The communication manager 1015 may be an example of aspects of the communication manager 1310 described herein.

The communication manager 1015, or its sub-components, may be implemented in hardware, code (e.g., software or firmware) executed by a processor, or any combination thereof. If implemented in code executed by a processor, the functions of the communication manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1015, or its sub-components, may be physically located at various positions, including being distributed such that portions of functions are implemented at different physical locations by one or more physical components. In some examples, the communication manager 1015, or its sub-components, may be a separate and distinct component in accordance with various aspects of the present disclosure. In some examples, the communication manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, the methods performed by the device 1005 may have one or more advantages. For instance, by transmitting an SSB that indicates an offset based on the CORESET bandwidth or the combination of the first and second parameters, the device 1005 may distribute the CORESETs for multiple UEs such that the CORESETs are disjoint in frequency. When the CORESETs are disjoint in frequency, the UEs may be less likely to experience contention when performing a random access procedure with the device 1005. As such, the device 1005 may improve the efficiency of wireless communications by reducing the likelihood of the UEs experiencing contention and may therefore provide an improved user experience. In such cases, the device 1005 may, on average, handle a greater number of UEs during a random access procedure than other devices which do not ensure that the CORESETs are disjoint in frequency.

Figure 11:
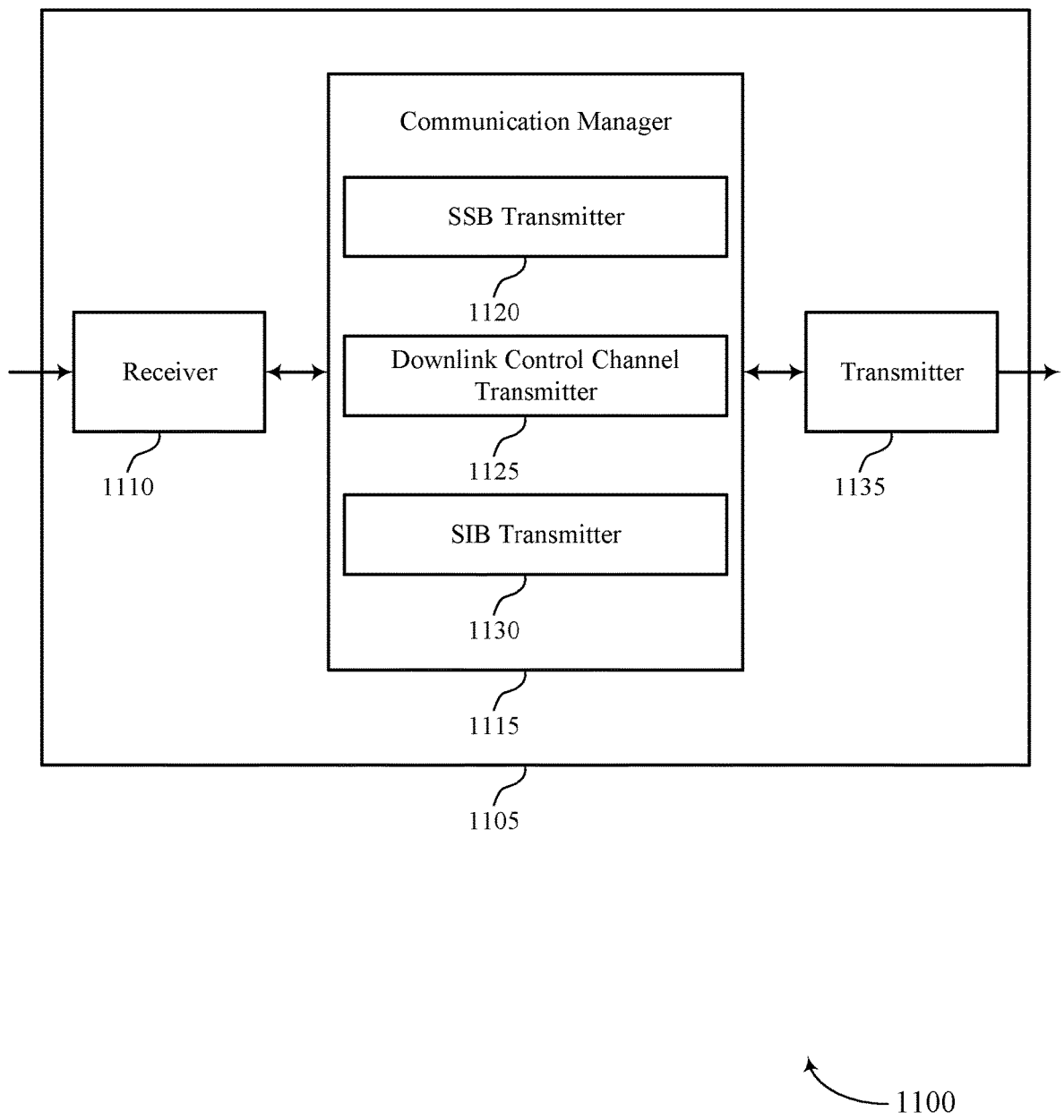

FIG. 11 shows a block diagram 1100 of a device 1105 that supports frequency configuration for CORESET in NTNs in accordance with aspects of the present disclosure. The device 1105 may be an example of aspects of a device 1005, a base station 105, or an NTN device 205 as described herein. The device 1105 may include a receiver 1110, a communication manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to frequency configuration for CORESET in NTNs, etc.). Information may be passed on to other components of the device 1105. The receiver 1110 may be an example of aspects of the transceiver 1320 described with reference to FIG. 13. The receiver 1110 may utilize a single antenna or a set of antennas.

The communication manager 1115 may be an example of aspects of the communication manager 1015 as described herein. The communication manager 1115 may include an SSB transmitter 1120, a downlink control channel transmitter 1125, and a SIB transmitter 1130. The communication manager 1115 may be an example of aspects of the communication manager 1310 described herein.

The SSB transmitter 1120 may transmit at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both.

The SIB transmitter 1130 may transmit SI based on the downlink control channel transmission.

The downlink control channel transmitter 1125 may transmit a downlink control channel transmission over the CORESET.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
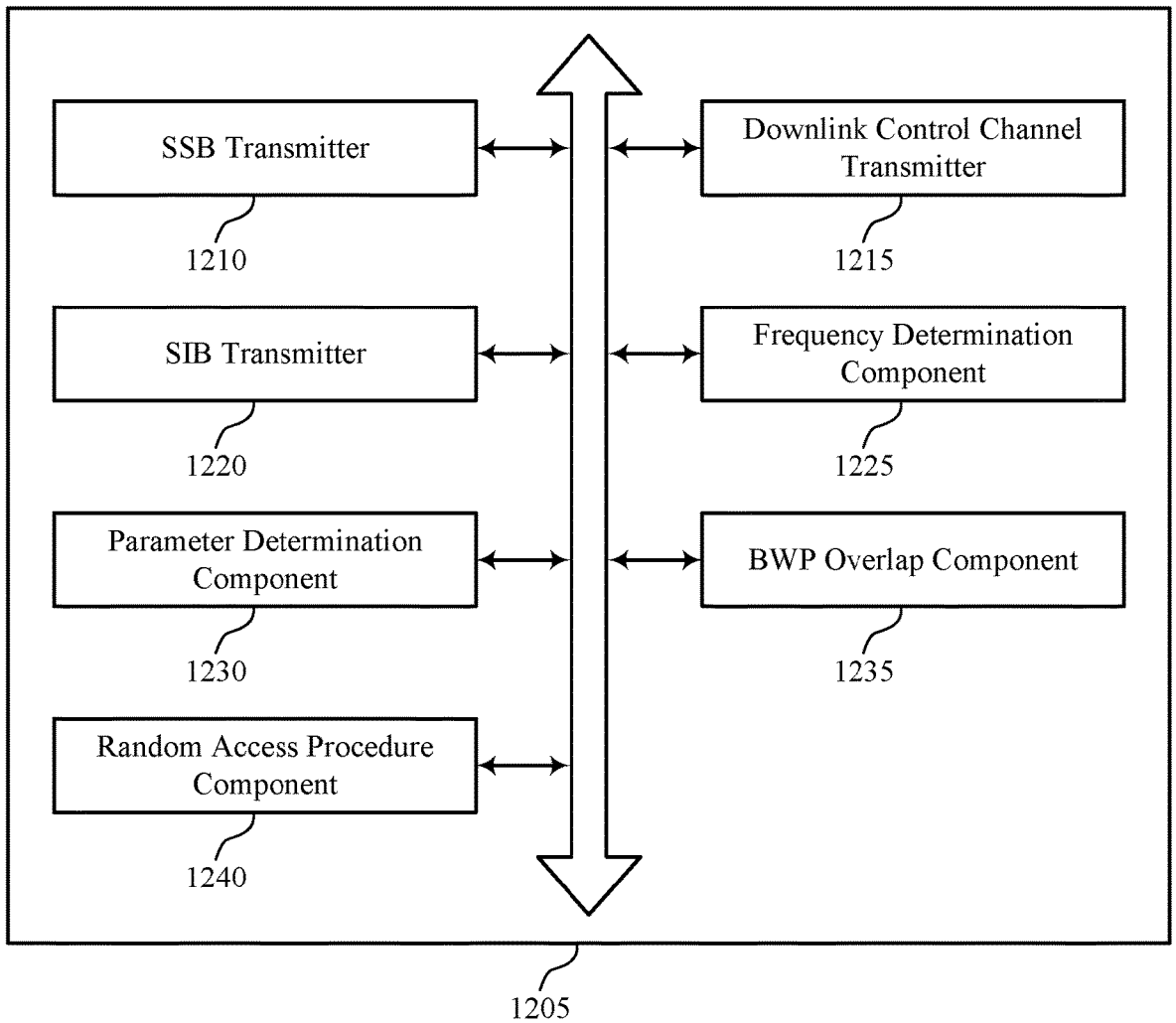
FIG. 12 shows a block diagram of a communication manager that supports frequency configuration for CORESET in NTNs in accordance with aspects of the present disclosure.

FIG. 12 shows a block diagram 1200 of a communication manager 1205 that supports frequency configuration for CORESET in NTNs in accordance with aspects of the present disclosure. The communication manager 1205 may be an example of aspects of a communication manager 1015, a communication manager 1115, or a communication manager 1310 described herein. The communication manager 1205 may include an SSB transmitter 1210, a downlink control channel transmitter 1215, a SIB transmitter 1220, a frequency determination component 1225, a parameter determination component 1230, a BWP overlap component 1235, and a random access procedure component 1240. Each of these modules may communicate, directly or indirectly, with one another (e.g., via one or more buses).

The SSB transmitter 1210 may transmit at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both. In some examples, the SSB transmitter 1210 may transmit an indication of a frequency offset. In some examples, the SSB transmitter 1210 may transmit, to the UE, the SSB In some examples, the SSB transmitter 1210 may transmit a MIB of the SSB, where the MIB includes the indication of the frequency offset. In some examples, the indication of the frequency offset includes an explicit indication of the frequency offset. In some example, the SSB is associated with a DMRS sequence that maps to the second frequency. In some cases, the CORESET bandwidth includes a bandwidth of the CORESET. In some examples, the SSB transmitter 1210 may transmit at the first frequency a second SSB prior to the SSB, where the second SSB indicates a third frequency of a second CORESET relative to the second SSB, where the CORESET bandwidth includes a bandwidth of the second CORESET.

In some examples, the SSB transmitter 1210 may transmit a MIB, where the first portion of the SSB includes a first field of the MIB, and where the second portion of the SSB includes one or more of: a spare bit of the MIB, a second field of the MIB, or a field of a PBCH transmission that is outside of the MIB. In some examples, the first field of the MIB is associated with the CORESET. In some examples, the SSB is associated with a DMRS sequence that maps to a value of the second parameter. In some examples, the SSB transmitter 1210 may transmit at a third frequency a second SSB that indicates a fourth frequency of a second CORESET relative to the second SSB, where the fourth frequency is based on one or more of: a bandwidth of the second CORESET, a combination of the first parameter associated with a first portion of the second SSB and the second parameter associated with a second portion of the second SSB, or both, where the SSB at least partially overlaps the second SSB in frequency, and where the second frequency and the fourth frequency are configured such that the CORESET and the second CORESET are non-overlapping in frequency based on the SSB overlapping with the second SSB.

In some cases, the second frequency and the fourth frequency being configured such that the CORESET and the second CORESET are non-overlapping in frequency includes the second frequency and the fourth frequency being associated with a same CORESET bandwidth and different SSB indices. In some cases, the second frequency and the fourth frequency being configured such that the CORESET and the second CORESET are non-overlapping in frequency includes a value of the first parameter of the first portion of the SSB being the same as the a value of the first parameter of the first portion of the second SSB and a value of the second parameter of the second portion of the SSB being different from a value of the second parameter of the second portion of the second SSB. In some cases, the second frequency and the fourth frequency being configured such that the CORESET and the second CORESET are non-overlapping in frequency includes the second frequency and the fourth frequency differing by at least the CORESET bandwidth. In some examples, the first frequency and the third frequency may be a same frequency.

The downlink control channel transmitter 1215 may transmit a downlink control channel transmission over the CORESET. In some examples, the downlink control channel transmitter 1215 may transmit a second downlink control channel transmission over the second CORESET.

The SIB transmitter 1220 may transmit SI based on the downlink control channel transmission. In some examples, the SIB transmitter 1220 may transmit second SI based on the second downlink control channel transmission.

The frequency determination component 1225 may determine the second frequency based on the first frequency and a frequency offset, where the frequency offset is based on the CORESET bandwidth. In some examples, the frequency determination component 1225 may determine the frequency offset based on an SSB index. In some examples, the frequency determination component 1225 may determine the frequency offset based on a user density at or within a threshold distance of a geographic location of a UE. In some examples, the frequency determination component 1225 may determine a frequency offset based on the combination of the first parameter associated with the first portion of the SSB and the second parameter associated with the second portion of the SSB. In some examples, the frequency determination component 1225 may determine the second frequency based on the first frequency and the frequency offset. In some examples, the frequency determination component 1225 may determine the second frequency based on combining the first parameter and the second parameter.

The parameter determination component 1230 may determine a value of the second parameter based on the CORESET bandwidth.

The BWP overlap component 1235 may determine an initial downlink BWP that overlaps with the CORESET in frequency.

The random access procedure component 1240 may perform a random access procedure over the initial downlink BWP based on transmitting the system information.

Figure 13:
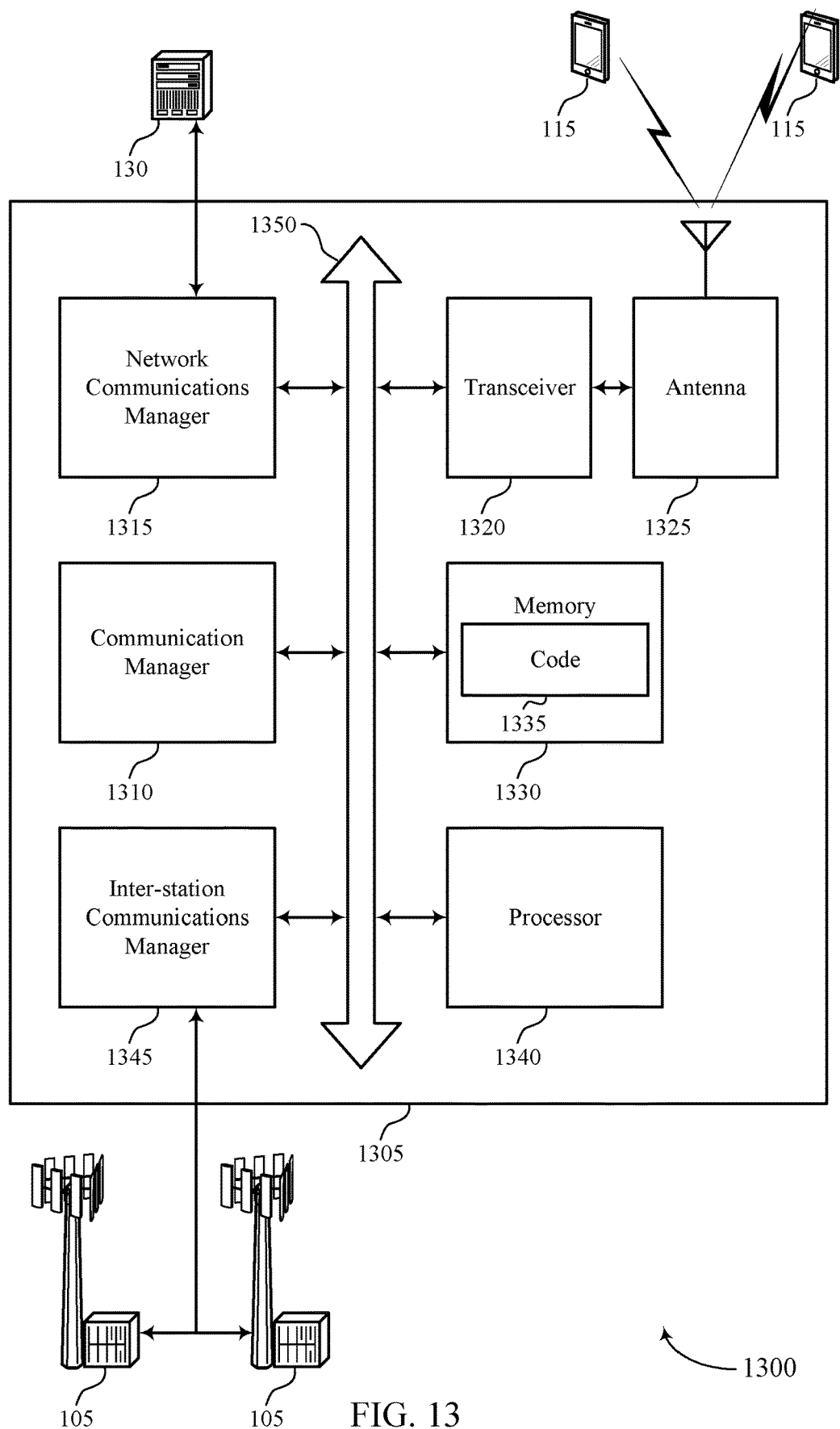
FIG. 13 shows a diagram of a system including a device that supports frequency configuration for CORESET in NTNs in accordance with aspects of the present disclosure.

FIG. 13 shows a diagram of a system 1300 including a device 1305 that supports frequency configuration for CORESET in NTNs in accordance with aspects of the present disclosure. The device 1305 may be an example of or include the components of device 1005, device 1105, a base station 105, an NTN device 205 as described herein. The device 1305 may include components for bi-directional voice and data communications including components for transmitting and receiving communications, including a communication manager 1310, a network communications manager 1315, a transceiver 1320, an antenna 1325, memory 1330, a processor 1340, and an inter-station communications manager 1345. These components may be in electronic communication via or coupled with one or more buses (e.g., bus 1350).

The communication manager 1310 may transmit at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both; transmit a downlink control channel transmission over the CORESET; and transmit SI based on the downlink control channel transmission.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting frequency configuration for CORESET in NTNs).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
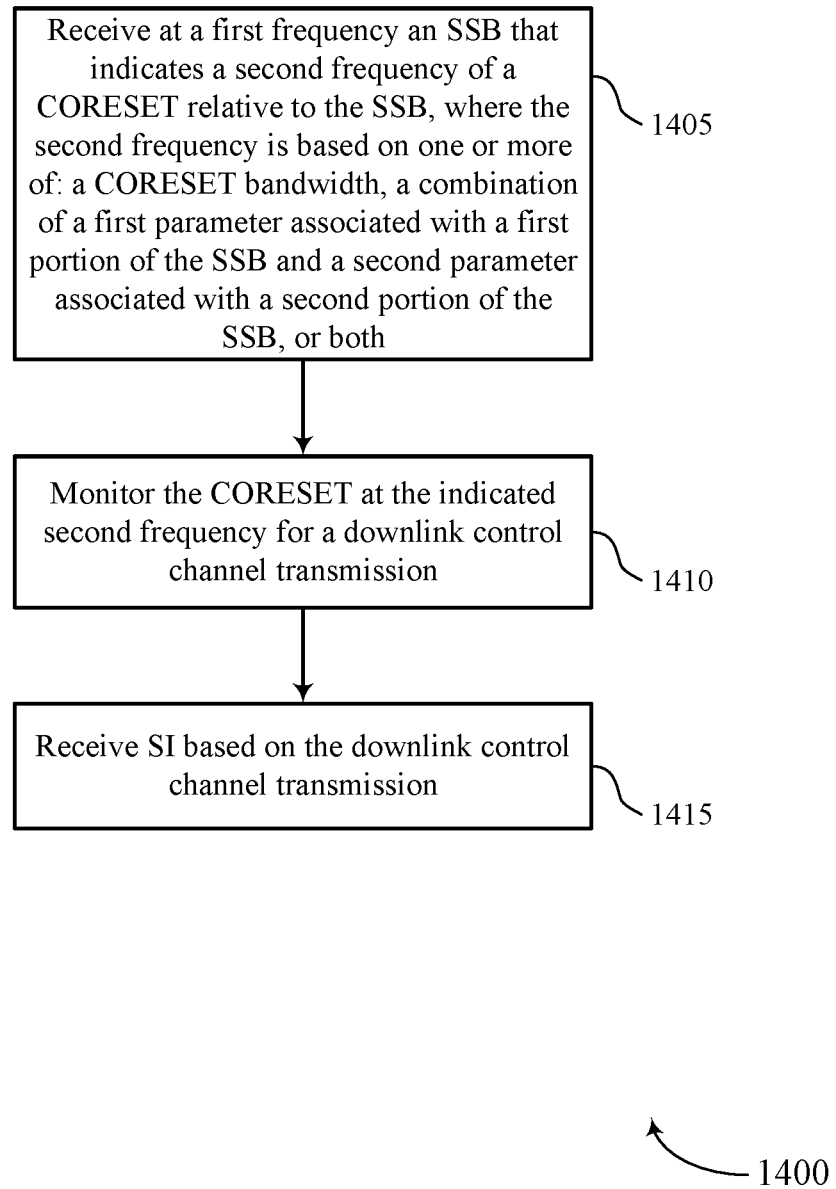
FIGS. 14 through 17 show flowcharts illustrating methods that support frequency configuration for CORESET in NTNs in accordance with aspects of the present disclosure.

In some examples, the methods performed by the device 1305 may have one or more advantages. For instance, by transmitting an SSB that indicates an offset based on the CORESET bandwidth or the combination of the first and second parameters, the device 1305 may distribute the CORESETs for multiple UEs such that the CORESETs are disjoint in frequency. When the CORESETs are disjoint in frequency, the UEs may be less likely to experience contention when performing a random access procedure with the device 1305. As such, the device 1305 may improve the efficiency of wireless communications by reducing the likelihood of the UEs experiencing contention and may therefore provide an improved user experience. In such cases, the device 1305 may, on average, handle a greater number of UEs during a random access procedure than other devices which do not ensure that the CORESETs are disjoint in frequency FIG. 14 shows a flowchart illustrating a method 1400 that supports frequency configuration for CORESET in NTNs in accordance with aspects of the present disclosure.

The operations of method 1400 may be implemented by a UE 115 or its components as described herein. For example, the operations of method 1400 may be performed by a communication manager as described with reference to FIGS. 6 through 9. In some examples, a UE may execute a set of instructions to control the functional elements of the UE to perform the described functions. Additionally, or alternatively, a UE may perform aspects of the described functions using special-purpose hardware.

At 1405, the UE may receive at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both. The operations of 1405 may be performed according to the methods described herein. In some examples, aspects of the operations of 1405 may be performed by an SSB receiver as described with reference to FIGS. 6 through 9.

At 1410, the UE may monitor the CORESET at the indicated second frequency for a downlink control channel transmission. The operations of 1410 may be performed according to the methods described herein. In some examples, aspects of the operations of 1410 may be performed by a CORESET monitoring component as described with reference to FIGS. 6 through 9.

At 1415, the UE may receive SI based on the downlink control channel transmission. The operations of 1415 may be performed according to the methods described herein. In some examples, aspects of the operations of 1415 may be performed by a SIB receiver as described with reference to FIGS. 6 through 9.

Figure 15:
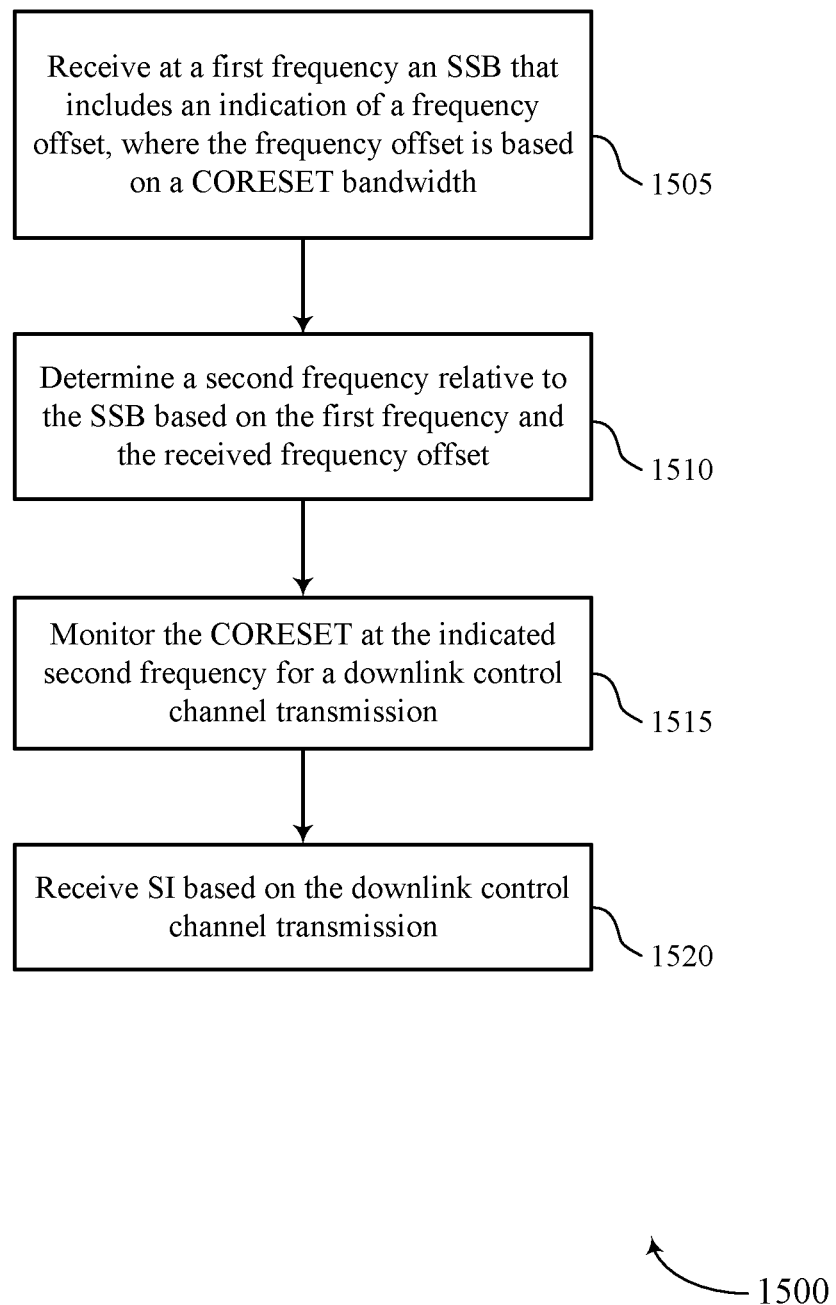

FIG. 15 shows a flowchart illustrating a method 1500 that supports frequency configuration for CORESET in NTNs in accordance with aspects of the present disclosure. The operations of method 1500 may be implemented by a UE 115 or its components as described herein. For example, the operations of method 1500 may be performed by a communication manager as described with reference to FIGS. 6 through 9. In some examples, a UE may execute a set of instructions to control the functional elements of the UE to perform the described functions. Additionally, or alternatively, a UE may perform aspects of the described functions using special-purpose hardware.

At 1505, the UE may receive at a first frequency an SSB that includes an indication of a frequency offset, where the frequency offset is based on a CORESET bandwidth. The operations of 1505 may be performed according to the methods described herein. In some examples, aspects of the operations of 1505 may be performed by an SSB receiver as described with reference to FIGS. 6 through 9.

At 1510, the UE may determine a second frequency relative to the SSB based on the first frequency and the received frequency offset. The operations of 1510 may be performed according to the methods described herein. In some examples, aspects of the operations of 1510 may be performed by a frequency determination component as described with reference to FIGS. 6 through 9.

At 1515, the UE may monitor the CORESET at the indicated second frequency for a downlink control channel transmission. The operations of 1515 may be performed according to the methods described herein. In some examples, aspects of the operations of 1515 may be performed by a CORESET monitoring component as described with reference to FIGS. 6 through 9.

At 1520, the UE may receive SI based on the downlink control channel transmission. The operations of 1520 may be performed according to the methods described herein. In some examples, aspects of the operations of 1520 may be performed by a SIB receiver as described with reference to FIGS. 6 through 9.

Figure 16:
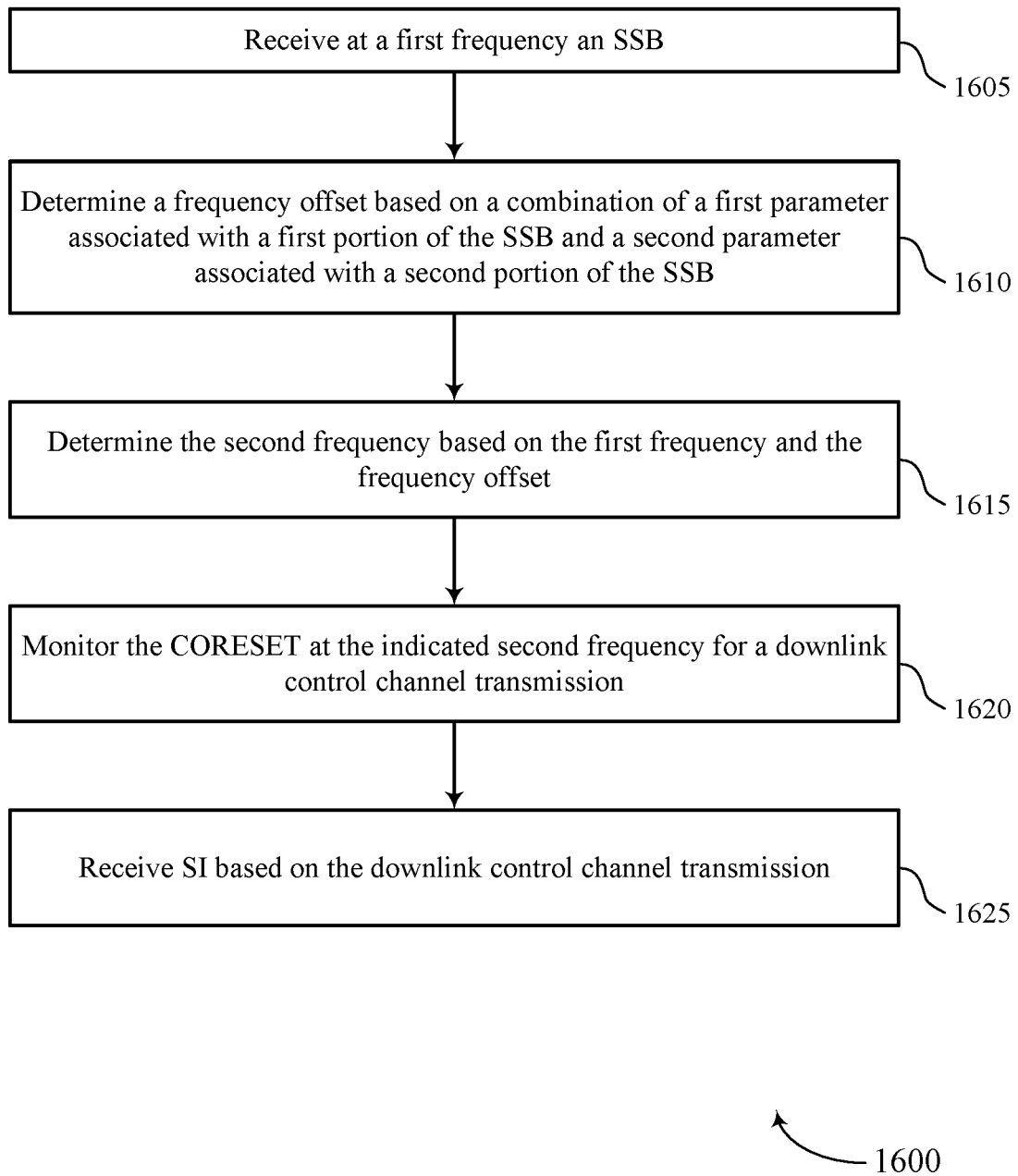

FIG. 16 shows a flowchart illustrating a method 1600 that supports frequency configuration for CORESET in NTNs in accordance with aspects of the present disclosure.

The operations of method 1600 may be implemented by a UE 115 or its components as described herein. For example, the operations of method 1600 may be performed by a communication manager as described with reference to FIGS. 6 through 9. In some examples, a UE may execute a set of instructions to control the functional elements of the UE to perform the described functions. Additionally, or alternatively, a UE may perform aspects of the described functions using special-purpose hardware.

At 1605, the UE may receive at a first frequency a SSB. The operations of 1605 may be performed according to the methods described herein. In some examples, aspects of the operations of 1605 may be performed by an SSB receiver as described with reference to FIGS. 6 through 9.

At 1610, the UE may determine a frequency offset based on a combination of a first parameter associated with a first portion of the SSB and a second parameter associated with a second portion of the SSB. The operations of 1610 may be performed according to the methods described herein. In some examples, aspects of the operations of 1610 may be performed by a frequency determination component as described with reference to FIGS. 6 through 9.

At 1615, the UE may determine the second frequency based on the first frequency and the frequency offset. The operations of 1615 may be performed according to the methods described herein. In some examples, aspects of the operations of 1615 may be performed by a frequency determination component as described with reference to FIGS. 6 through 9.

At 1620, the UE may monitor the CORESET at the indicated second frequency for a downlink control channel transmission. The operations of 1620 may be performed according to the methods described herein. In some examples, aspects of the operations of 1620 may be performed by a CORESET monitoring component as described with reference to FIGS. 6 through 9.

At 1625, the UE may receive SI based on the downlink control channel transmission. The operations of 1625 may be performed according to the methods described herein. In some examples, aspects of the operations of 1625 may be performed by a SIB receiver as described with reference to FIGS. 6 through 9.

Figure 17:
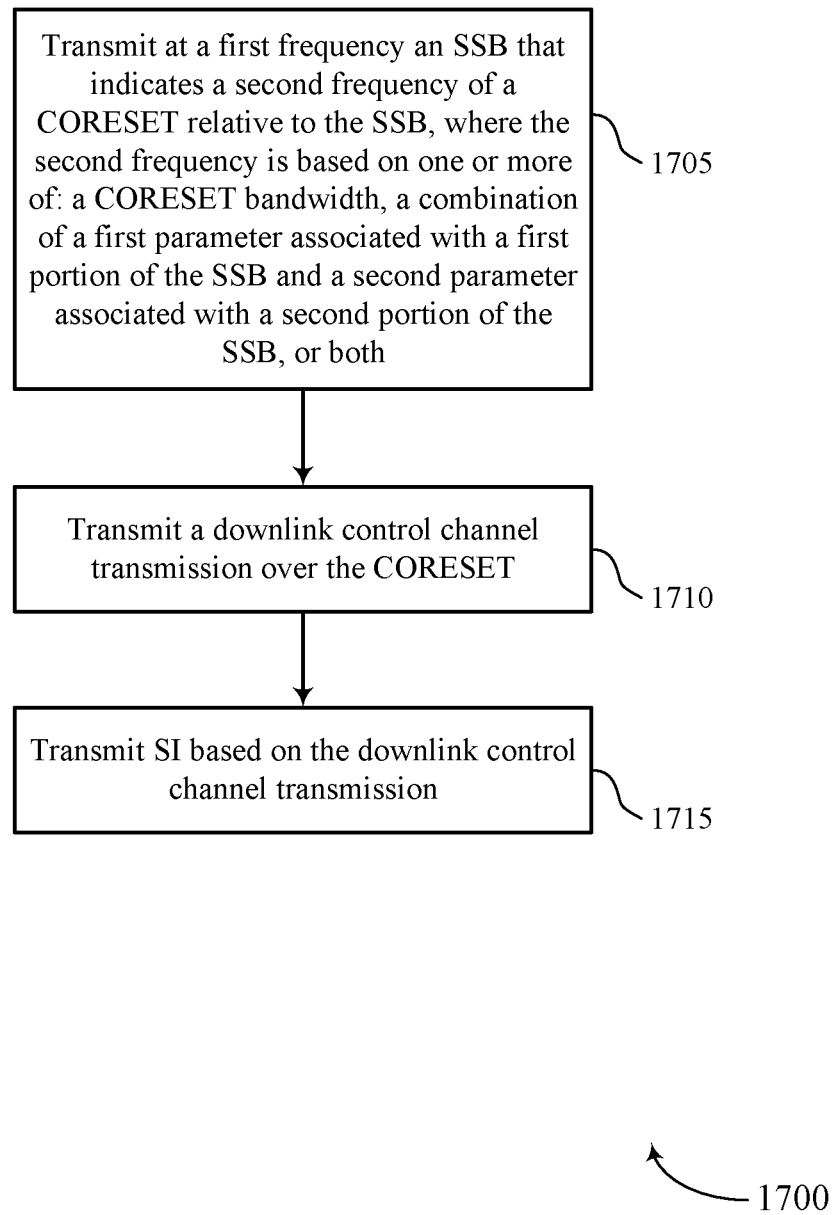

FIG. 17 shows a flowchart illustrating a method 1700 that supports frequency configuration for CORESET in NTNs in accordance with aspects of the present disclosure. The operations of method 1700 may be implemented by a base station 105, an NTN device, or their components as described herein. For example, the operations of method 1700 may be performed by a communication manager as described with reference to FIGS. 10 through 13. In some examples, a base station or NTN device may execute a set of instructions to control the functional elements of the base station or NTN device to perform the described functions. Additionally, or alternatively, a base station or NTN device may perform aspects of the described functions using special-purpose hardware.

At 1705, the base station or the NTN device may transmit at a first frequency an SSB that indicates a second frequency of a CORESET relative to the SSB, where the second frequency is based on one or more of: a CORESET bandwidth, a combination of a first parameter associated with a first portion of the SSB and a second parameter associated with a second portion of the SSB, or both. The operations of 1705 may be performed according to the methods described herein. In some examples, aspects of the operations of 1705 may be performed by an SSB transmitter as described with reference to FIGS. 10 through 13.

At 1710, the base station or the NTN device may transmit a downlink control channel transmission over the CORESET. The operations of 1710 may be performed according to the methods described herein. In some examples, aspects of the operations of 1710 may be performed by a downlink control channel transmitter as described with reference to FIGS. 10 through 13.

At 1715, the base station or the NTN device may transmit SI based on the downlink control channel transmission. The operations of 1715 may be performed according to the methods described herein. In some examples, aspects of the operations of 1715 may be performed by a SIB transmitter as described with reference to FIGS. 10 through 13.

The following provides an overview of aspects of the present disclosure:

Aspect 1: A method for wireless communication, comprising: receiving at a first frequency an SSB that indicates a second frequency of a CORESET relative to the SSB, wherein the second frequency is based at least in part on one or more of: a CORESET bandwidth, a combination of a first parameter associated with a first portion of the SSB and a second parameter associated with a second portion of the SSB, or both; monitoring the CORESET at the indicated second frequency for a downlink control channel transmission; and receiving SI based at least in part on the downlink control channel transmission.

Aspect 2: The method of aspect 1, wherein receiving at the first frequency the SSB comprises: receiving an indication of a frequency offset, wherein the frequency offset is based at least in part on the CORESET bandwidth; and determining the second frequency based at least in part on the first frequency and the received frequency offset.

Aspect 3: The method of aspect 2, wherein the frequency offset is further based at least in part on a SSB index.

Aspect 4: The method of any of aspects 2 through 3, wherein the frequency offset is further based at least in part on a user density at or within a threshold distance of a geographic location of the UE.

Aspect 5: The method of any of aspects 2 through 4, wherein receiving the indication of the frequency offset comprises: receiving a MIB of the SSB, wherein the MIB comprises the indication of the frequency offset.

Aspect 6: The method of aspect 5, wherein the indication of the frequency offset comprises an explicit indication of the frequency offset.

Aspect 7: The method of any of aspects 2 through 6, wherein the SSB is associated with a DMRS sequence that maps to the second frequency.

Aspect 8: The method of any of aspects 2 through 7, wherein the CORESET bandwidth comprises a bandwidth of the CORESET.

Aspect 9: The method of any of aspects 2 through 8, further comprising: receiving at the first frequency a second SSB prior to the SSB, wherein the second SSB indicates a third frequency of a second CORESET relative to the second SSB, wherein the CORESET bandwidth comprises a bandwidth of the second CORESET.

Aspect 10: The method of any of aspects 1 through 9, further comprising: determining a frequency offset based at least in part on the combination of the first parameter associated with the first portion of the SSB and the second parameter associated with the second portion of the SSB; and determining the second frequency based at least in part on the first frequency and the frequency offset.

Aspect 11: The method of aspect 10, wherein receiving at the first frequency the SSB comprises: receiving a MIB, wherein the first portion of the SSB comprises a first field of the MIB, and wherein the second portion of the SSB comprises one or more of: a spare bit of the MIB, a second field of the MIB, or a field of a PBCH transmission that is outside of the MIB.

Aspect 12: The method of aspect 11, wherein the first field of the MIB is associated with the CORESET.

Aspect 13: The method of any of aspects 10 through 12, wherein the SSB is associated with a DMRS sequence that maps to the second parameter.

Aspect 14: The method of any of aspects 10 through 13, further comprising: determining that the second parameter is absent from the SSB; and determining the second parameter based at least in part on the CORESET bandwidth and the absence of the second parameter from the SSB.

Aspect 15: The method of any of aspects 10 through 14, wherein determining the frequency offset comprises: combining the first parameter and the second parameter.

Aspect 16: The method of any of aspects 1 through 15, further comprising: determining an initial downlink BWP that overlaps with the CORESET in frequency based at least in part on receiving the system information; and performing a random access procedure over the initial downlink BWP.

Aspect 17: A method for wireless communication, comprising: transmitting at a first frequency a SSB that indicates a second frequency of a CORESET relative to the SSB, wherein the second frequency is based at least in part on one or more of: a CORESET bandwidth, a combination of a first parameter associated with a first portion of the SSB and a second parameter associated with a second portion of the SSB, or both; transmitting a downlink control channel transmission over the CORESET; and transmitting SI based at least in part on the downlink control channel transmission.

Aspect 18: The method of aspect 17, wherein transmitting at the first frequency the SSB comprises: determining the second frequency based at least in part on the first frequency and a frequency offset, wherein the frequency offset is based at least in part on the CORESET bandwidth; and transmitting an indication of the frequency offset.

Aspect 19: The method of aspect 18, further comprising: determining the frequency offset based at least in part on a SSB index.

Aspect 20: The method of any of aspects 18 through 19, further comprising: determining the frequency offset based at least in part on a user density at or within a threshold distance of a geographic location of a UE; and transmitting, to the UE, the SSB.

Aspect 21: The method of any of aspects 18 through 20, wherein transmitting the indication of the frequency offset comprises: transmitting a MIB of the SSB, wherein the MIB comprises the indication of the frequency offset.

Aspect 22: The method of aspect 21, wherein the indication of the frequency offset comprises an explicit indication of the frequency offset.

Aspect 23: The method of any of aspects 18 through 22, wherein the SSB is associated with a DMRS sequence that maps to the second frequency.

Aspect 24: The method of any of aspects 18 through 23, wherein the CORESET bandwidth comprises a bandwidth of the CORESET.

Aspect 25: The method of any of aspects 18 through 24, further comprising: transmitting at the first frequency a second SSB prior to the SSB, wherein the second SSB indicates a third frequency of a second CORESET relative to the second SSB, wherein the CORESET bandwidth comprises a bandwidth of the second CORESET.

Aspect 26: The method of any of aspects 17 through 25, further comprising: determining a frequency offset based at least in part on the combination of the first parameter associated with the first portion of the SSB and the second parameter associated with the second portion of the SSB; and determining the second frequency based at least in part on the first frequency and the frequency offset.

Aspect 27: The method of aspect 26, wherein transmitting at the first frequency the SSB comprises: transmitting a MIB, wherein the first portion of the SSB comprises a first field of the MIB, and wherein the second portion of the SSB comprises one or more of: a spare bit of the MIB, a second field of the MIB, or a field of a PBCH transmission that is outside of the MIB.

Aspect 28: The method of aspect 27, wherein the first field of the MIB is associated with the CORESET.

Aspect 29: The method of any of aspects 27 through 28, wherein the SSB is associated with a DMRS sequence that maps to a value of the second parameter.

Aspect 30: The method of any of aspects 27 through 29, further comprising: determining a value of the second parameter based at least in part on the CORESET bandwidth.

Aspect 31: The method of any of aspects 27 through 30, further comprising: determining the second frequency based at least in part on combining the first parameter and the second parameter.

Aspect 32: The method of any of aspects 17 through 31, further comprising: determining an initial downlink BWP that overlaps with the CORESET in frequency; and performing a random access procedure over the initial downlink BWP based at least in part on transmitting the system information.

Aspect 33: The method of any of aspects 17 through 32, further comprising: transmitting at a third frequency a second SSB that indicates a fourth frequency of a second CORESET relative to the second SSB, wherein the fourth frequency is based at least in part on one or more of: a bandwidth of the second CORESET, a combination of the first parameter associated with a first portion of the second SSB and the second parameter associated with a second portion of the second SSB, or both, wherein the SSB at least partially overlaps the second SSB in frequency, and wherein the second frequency and the fourth frequency are configured such that the CORESET and the second CORESET are non-overlapping in frequency based at least in part on the SSB overlapping with the second SSB; transmitting a second downlink control channel transmission over the second CORESET; and transmitting second SI based at least in part on the second downlink control channel transmission.

Aspect 34: The method of aspect 33, wherein the second frequency and the fourth frequency being configured such that the CORESET and the second CORESET are non-overlapping in frequency comprises the second frequency and the fourth frequency being associated with a same CORESET bandwidth and different SSB indices.

Aspect 35: The method of any of aspects 33 through 34, wherein the second frequency and the fourth frequency being configured such that the CORESET and the second CORESET are non-overlapping in frequency comprises a value of the first parameter of the first portion of the SSB being the same as the a value of the first parameter of the first portion of the second SSB and a value of the second parameter of the second portion of the SSB being different from a value of the second parameter of the second portion of the second SSB.

Aspect 36: The method of any of aspects 33 through 35, wherein the second frequency and the fourth frequency being configured such that the CORESET and the second CORESET are non-overlapping in frequency comprises the second frequency and the fourth frequency differing by at least the CORESET bandwidth.

Aspect 37: The method of any of aspects 33 through 36, wherein the first frequency and the third frequency comprise a same frequency.

Aspect 38: An apparatus for wireless communication, comprising a processor; memory coupled with the processor; and instructions stored in the memory and executable by the processor to cause the apparatus to perform a method of any of aspects 1 through 16.

Aspect 39: An apparatus for wireless communication, comprising at least one means for performing a method of any of aspects 1 through 16.

Aspect 40: A non-transitory computer-readable medium storing code for wireless communication, the code comprising instructions executable by a processor to perform a method of any of aspects 1 through 16.

Aspect 41: An apparatus for wireless communication, comprising a processor; memory coupled with the processor; and instructions stored in the memory and executable by the processor to cause the apparatus to perform a method of any of aspects 17 through 37.

Aspect 42: An apparatus for wireless communication, comprising at least one means for performing a method of any of aspects 17 through 37.

Aspect 43: A non-transitory computer-readable medium storing code for wireless communication, the code comprising instructions executable by a processor to perform a method of any of aspects 17 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
one or more processors,
memory coupled with the one or more processors, and
instructions stored in the memory and executable by the one or more processors to cause the apparatus to:
receive at a first frequency a synchronization signal block that indicates a second frequency of a control resource set relative to the synchronization signal block, wherein the second frequency is based at least in part on one or more of: an offset associated with a control resource set bandwidth, a combination of a first parameter associated with a first portion of the synchronization signal block and a second parameter associated with a second portion of the synchronization signal block, or both;
receive an indication of a frequency offset, wherein the frequency offset comprises the offset associated with the control resource set bandwidth;
determine the second frequency based at least in part on the first frequency and the received frequency offset;
receive at the first frequency a second synchronization signal block, wherein the second synchronization signal block indicates a third frequency of a second control resource set relative to the second synchronization signal block, wherein the control resource set bandwidth comprises a bandwidth of the second control resource set;
monitor the control resource set at the indicated second frequency for a downlink control channel transmission; and
receive system information based at least in part on the downlink control channel transmission.

2. The apparatus of claim 1, wherein the frequency offset is further based at least in part on a synchronization signal block index.

3. The apparatus of claim 1, wherein the frequency offset is further based at least in part on a user density at or within a threshold distance of a geographic location of the apparatus.

4. The apparatus of claim 1, wherein the instructions to receive the indication of the frequency offset are executable by the one or more processors to cause the apparatus to:
receive a master information block of the synchronization signal block, wherein the master information block comprises the indication of the frequency offset.

5. The apparatus of claim 4, wherein the indication of the frequency offset comprises an explicit indication of the frequency offset.

6. The apparatus of claim 1, wherein the synchronization signal block is associated with a demodulation reference signal sequence that maps to the second frequency.

7. The apparatus of claim 1, wherein the control resource set bandwidth comprises a bandwidth of the control resource set.

8. The apparatus of claim 1, wherein the instructions are further executable by the one or more processors to cause the apparatus to:

determine a frequency offset based at least in part on the combination of the first parameter associated with the first portion of the synchronization signal block and the second parameter associated with the second portion of the synchronization signal block; and
determine the second frequency based at least in part on the first frequency and the frequency offset.

9. The apparatus of claim 8, wherein the instructions to receive at the first frequency the synchronization signal block are executable by the one or more processors to cause the apparatus to:
receive a master information block, wherein the first portion of the synchronization signal block comprises a first field of the master information block, and wherein the second portion of the synchronization signal block comprises one or more of: a spare bit of the master information block, a second field of the master information block, or a field of a physical broadcast channel transmission that is outside of the master information block.

10. The apparatus of claim 9, wherein the first field of the master information block is associated with the control resource set.

11. The apparatus of claim 8, wherein the synchronization signal block is associated with a demodulation reference signal sequence that maps to the second parameter.

12. The apparatus of claim 8, wherein the instructions are further executable by the one or more processors to cause the apparatus to:
determine that the second parameter is absent from the synchronization signal block; and
determine the second parameter based at least in part on the control resource set bandwidth and an absence of the second parameter from the synchronization signal block.

13. The apparatus of claim 8, wherein the instructions to determine the frequency offset are executable by the one or more processors to cause the apparatus to:
combine the first parameter and the second parameter.

14. The apparatus of claim 1, wherein the instructions are further executable by the one or more processors to cause the apparatus to:
determine an initial downlink bandwidth part that overlaps with the control resource set in frequency based at least in part on receiving the system information; and
perform a random access procedure over the initial downlink bandwidth part.

15. An apparatus for wireless communication, comprising:
one or more processors,
memory coupled with the one or more processors, and
instructions stored in the memory and executable by the one or more processors to cause the apparatus to:
transmit at a first frequency a synchronization signal block that indicates a second frequency of a control resource set relative to the synchronization signal block, wherein the second frequency is based at least in part on one or more of: an offset associated with a control resource set bandwidth, a combination of a first parameter associated with a first portion of the synchronization signal block and a second parameter associated with a second portion of the synchronization signal block, or both, wherein the second frequency is determined based at least in part on the first frequency;

transmit an indication of a frequency offset that comprises the offset associated with the control resource set bandwidth;
transmit at the first frequency a second synchronization signal block, wherein the second synchronization signal block indicates a third frequency of a second control resource set relative to the second synchronization signal block, wherein the control resource set bandwidth comprises a bandwidth of the second control resource set;
transmit a downlink control channel transmission over the control resource set; and
transmit system information based at least in part on the downlink control channel transmission.

16. The apparatus of claim 15, wherein the instructions are further executable by the one or more processors to cause the apparatus to:
determine the frequency offset based at least in part on a synchronization signal block index.

17. The apparatus of claim 15, wherein the instructions are further executable by the one or more processors to cause the apparatus to:
determine the frequency offset based at least in part on a user density at or within a threshold distance of a geographic location of a user equipment (UE); and
transmit, to the UE, the synchronization signal block.

18. The apparatus of claim 15, wherein the instructions to transmit the indication of the frequency offset are executable by the one or more processors to cause the apparatus to:
transmit a master information block of the synchronization signal block, wherein the master information block comprises the indication of the frequency offset.

19. The apparatus of claim 15, wherein the synchronization signal block is associated with a demodulation reference signal sequence that maps to the second frequency.

20. The apparatus of claim 15, wherein the control resource set bandwidth comprises a bandwidth of the control resource set.

21. The apparatus of claim 15, wherein the instructions are further executable by the one or more processors to cause the apparatus to:
determine a frequency offset based at least in part on the combination of the first parameter associated with the first portion of the synchronization signal block and the second parameter associated with the second portion of the synchronization signal block; and
determine the second frequency based at least in part on the first frequency and the frequency offset.

22. The apparatus of claim 15, wherein the instructions are further executable by the one or more processors to cause the apparatus to:
determine an initial downlink bandwidth part that overlaps with the control resource set in frequency; and
perform a random access procedure over the initial downlink bandwidth part based at least in part on transmitting the system information.

23. The apparatus of claim 15, wherein the instructions are further executable by the one or more processors to cause the apparatus to:
transmit at a third frequency a second synchronization signal block that indicates a fourth frequency of a second control resource set relative to the second synchronization signal block, wherein the fourth frequency is based at least in part on one or more of: a bandwidth of the second control resource set, a combination of the first parameter associated with a first portion of the second synchronization signal block and the second parameter associated with a second portion of the second synchronization signal block, or both, wherein the synchronization signal block at least partially overlaps the second synchronization signal block in frequency, and wherein the second frequency and the fourth frequency are configured such that the control resource set and the second control resource set are non-overlapping in frequency based at least in part on the synchronization signal block overlapping with the second synchronization signal block;
transmit a second downlink control channel transmission over the second control resource set; and
transmit second system information based at least in part on the second downlink control channel transmission.

24. The apparatus of claim 23, wherein the second frequency and the fourth frequency being configured such that the control resource set and the second control resource set are non-overlapping in frequency comprises the second frequency and the fourth frequency being associated with a same control resource set bandwidth and different synchronization signal block indices.

25. A method for wireless communication, comprising:
receiving at a first frequency a synchronization signal block that indicates a second frequency of a control resource set relative to the synchronization signal block, wherein the second frequency is based at least in part on one or more of: an offset associated with a control resource set bandwidth, a combination of a first parameter associated with a first portion of the synchronization signal block and a second parameter associated with a second portion of the synchronization signal block, or both;
receiving an indication of a frequency offset, wherein the frequency offset comprises the offset associated with the control resource set bandwidth;
determining the second frequency based at least in part on the first frequency and the received frequency offset;
receiving at the first frequency a second synchronization signal block, wherein the second synchronization signal block indicates a third frequency of a second control resource set relative to the second synchronization signal block, wherein the control resource set bandwidth comprises a bandwidth of the second control resource set;
monitoring the control resource set at the indicated second frequency for a downlink control channel transmission; and
receiving system information based at least in part on the downlink control channel transmission.

26. A method for wireless communication, comprising:
transmitting at a first frequency a synchronization signal block that indicates a second frequency of a control resource set relative to the synchronization signal block, wherein the second frequency is based at least in part on one or more of: an offset associated with a control resource set bandwidth, a combination of a first parameter associated with a first portion of the synchronization signal block and a second parameter associated with a second portion of the synchronization signal block, or both wherein the second frequency is determined based at least in part on the first frequency and a frequency offset;
transmitting an indication of a frequency offset that comprises the offset associated with the control resource set bandwidth;
transmitting at the first frequency a second synchronization signal block prior to the synchronization signal block, wherein the second synchronization signal block indicates a third frequency of a second control resource set relative to the second synchronization signal block, wherein the control resource set bandwidth comprises a bandwidth of the second control resource set;

transmitting a downlink control channel transmission over the control resource set; and transmitting system information based at least in part on the downlink control channel transmission.

* * * * *